US007720094B2

(12) United States Patent
Turner et al.

(10) Patent No.: US 7,720,094 B2
(45) Date of Patent: May 18, 2010

(54) METHODS AND APPARATUS FOR LOW LATENCY SIGNAL AGGREGATION AND BANDWIDTH REDUCTION

(75) Inventors: R. Brough Turner, Newton Corner, MA (US); Kevin J. Breummer, Southington, CT (US); Michael R. Matatia, Stow, MA (US); Andrei E. Toma, Framingham, MA (US); Svetlana O. Sokolova, Newton, MA (US)

(73) Assignee: Verso Backhaul Solutions, Inc., Atlanta, GA (US)

( * ) Notice: Subject to any disclaimer, the term of this patent is extended or adjusted under 35 U.S.C. 154(b) by 755 days.

(21) Appl. No.: 11/358,730

(22) Filed: Feb. 21, 2006

(65) Prior Publication Data

US 2007/0195815 A1 Aug. 23, 2007

(51) Int. Cl.
*H04J 3/16* (2006.01)
(52) U.S. Cl. .................. 370/465; 370/464; 714/776
(58) Field of Classification Search .............. 370/464, 370/465, 498, 521; 348/14.01, 14.12, 14.13; 379/67.1, 88.08, 88.1; 714/776
See application file for complete search history.

(56) References Cited

U.S. PATENT DOCUMENTS

| 4,627,049 | A |   | 12/1986 | Black |     |
|-----------|---|---|---------|-------|-----|
| 5,349,636 | A |   | 9/1994  | Irribarren |     |
| 5,459,722 | A |   | 10/1995 | Sherif |     |
| 5,809,472 | A | * | 9/1998  | Morrison | 704/500 |
| 5,815,663 | A |   | 9/1998  | Uomini |     |
| 6,320,876 | B1 |  | 11/2001 | Virdee |     |
| 6,420,980 | B1 | * | 7/2002  | Ejima | 341/65 |
| 6,452,991 | B1 | * | 9/2002  | Zak | 375/365 |
| 6,459,687 | B1 |  | 10/2002 | Bourlas |     |
| 6,577,595 | B1 |  | 6/2003  | Counterman |     |
| 6,628,609 | B2 |  | 9/2003  | Chapman |     |
| 6,643,260 | B1 |  | 11/2003 | Kloth |     |

(Continued)

OTHER PUBLICATIONS

Levinson, E., "Exchanging SGML documents using internet mail and MIME," Computer Standards & Interfaces 18 (1996) 93-102.

(Continued)

*Primary Examiner*—William Trost, IV
*Assistant Examiner*—Kyle C Kasparek
(74) *Attorney, Agent, or Firm*—Chapin IP Law, LLC

(57) ABSTRACT

Wireless network demands continually increase as wireless service providers pursue additional service capabilities. In a cellular communication system, leased lines between remote cell sites and the corresponding Mobile Switching Offices (MSOs) remain a major operating cost. Bandwidth reduction by identification and elimination of payload data and control information which need not be fully replicated because it can be deduced from information accessible or previously transmitted allows fewer lines to support the same bandwidth. A wireless access gateway is operable to aggregate such redundant and regenerable data on a backhaul link between a wireless cell site and the corresponding mobile switching office (MSO) to provide low-latency, type specific lossless bandwidth reduction. The wireless access gateway identifies regenerable information and eliminates portions of the data which the device need not transmit because the data is redundant, or accessible or recreatable, at the receiving side. In this manner, the access device allows fewer lines to carry the reduced message traffic by transmitting only the non-recreatable data and eliminating message traffic for regenerable information.

33 Claims, 12 Drawing Sheets

U.S. PATENT DOCUMENTS

| | | |
|---|---|---|
| 7,471,777 B2 | 12/2008 | Bremer |
| 2002/0002636 A1* | 1/2002 | Vange et al. ............... 709/328 |
| 2003/0043751 A1* | 3/2003 | Nelson ..................... 370/244 |
| 2003/0137979 A1* | 7/2003 | Hayon et al. ............... 370/392 |
| 2004/0225494 A1* | 11/2004 | Mayginnes et al. ......... 704/215 |

OTHER PUBLICATIONS

MailMan, Endymion Corporation, http://web.archive.org/web/1998....endymino.com/products, XP-002247286, 3 pages.

Atkins, et al., "Integrated Web and Telephone Service Creation," Bell Labs Technical Journal, Winter 1997, 19-35, XP 000659566.

\* cited by examiner

| TRFFIC TYPE | OPERATION NAME | REFERENCE ADDR |
|---|---|---|
| 2G VOICE<br>2G DATA<br>2G SIGNALING<br>3G VOICE<br>3G DATA<br>3G SIGNALING<br>IP<br>ATM | | |

Fig. 9

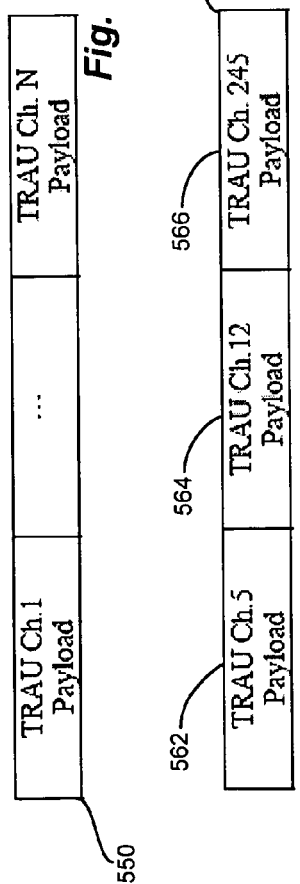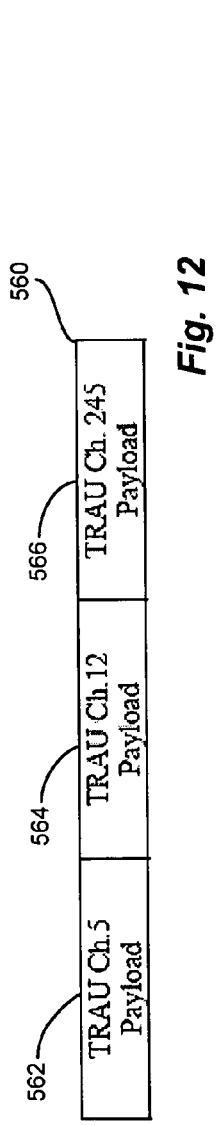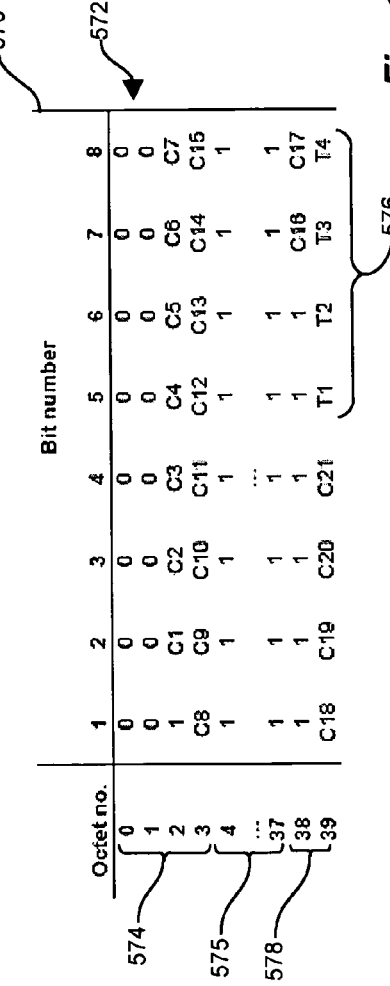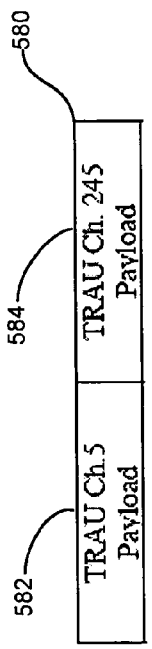
Fig. 11
Fig. 12
Fig. 13
Fig. 14

METHODS AND APPARATUS FOR LOW LATENCY SIGNAL AGGREGATION AND BANDWIDTH REDUCTION

CLAIM TO BENEFIT OF EARLIER FILED PATENT APPLICATIONS

This invention claims the benefit of the filing dates and disclosure contained in the following earlier filed U.S. Provisional Patent Applications:

1: Provisional Patent Application having U.S. Ser. No. 60/401,503 filed Aug. 6, 2002, entitled "DIGITAL CIRCUIT MULTIPLICATION EQUIPMENT FOR A WIRELESS SERVICE PROVIDER'S RADIO ACCESS NETWORK"; and 2: Provisional Patent Application having U.S. Ser. No. 60/460,597 filed Apr. 4, 2003, entitled "METHODS AND APPARATUS FOR DIGITAL CIRCUIT MULTIPLICATION"; And the following U.S. Utility Patent Application:

3: Utility Patent Application having U.S. Ser. No. 10/633,260, filed Aug. 1, 2003, entitled "METHODS AND APPARATUS FOR NETWORK SIGNAL AGGREGATION AND BANDWIDTH REDUCTION"

Each of the above referenced patent applications shares co-inventorship with, and is assigned to the same assignee as the present patent application. The entire teachings and disclosure of these referenced patent applications are hereby incorporated by reference herein in their entirety.

BACKGROUND OF THE INVENTION

Modern conventional computer networks transport an ever increasing volume of data between interconnected computers. Bandwidth-hungry user applications continually burden such computer networks, such as a collection of interconnections known as the Internet and many other subnetworks such as intranets, extranets, and LANs, with demands for additional throughput volume to allow the conventional networks to transport additional data.

The conventional interconnections in such networks include a variety of wired and wireless transport mechanisms such as cellular, Global System Mobile (GSM), satellite, optical fiber, coaxial cable, and twisted pair, to name several. The conventional transport mediums carry a broad diversity of traffic types, such as voice, data, streaming media, and signaling traffic according to many different protocols and switching mechanisms, such as TCP/IP, CDMA, TDMA, FDMA, ATM, and others as are known to those skilled in the art.

In a conventional wireless communications network, that originally evolved to support simple analog wireless voice communications, new increasing demands for services and applications such as digital voice, remote email, wireless Internet, and laptop computer support have imposed additional bandwidth demands and additional message traffic formats, or protocols, to support the user demand for these new features. The so-called first generation (1G) analog voice cellular network infrastructure has evolved to support second generation (2G) voice and data, and is rapidly moving in the direction of widespread third generation (3G) deployment, including support for digital voice, enhanced data services and signaling support.

The increasing wireless demand and corresponding deployment of additional conventional wireless transceivers drives a need to provide sufficient wired links to the transceivers. In a conventional wireless communications network, field deployment of base transceiver stations (BTSs) at a conventional "cell site" support wireless links to a plurality of wireless subscribers (end-users) that operate wireless phones and other mobile communications equipment. Dense deployment of conventional BTSs and other equipment operable to support end-user wireless connections strives to allow uninterrupted, high-bandwidth support to the wireless subscribers. Typically, however, multiple BTSs couple to a conventional mobile switching office (MSO) via a conventional wired or "land line" that in turn provide a data communications link for interconnection into a public access network such as a Public Switched Telephone Network (PSTN) or a computer network such as the Internet. Deployment of additional cell sites to support to increasing numbers of subscribers and additional BTSs requires sufficient high speed trunk lines between the cell sites and the MSO to support the increasing number of conventional end-user wireless connections.

SUMMARY

Conventional wireless network providers operating the MSO typically employ leased lines for the high speed communications trunks between the cell sites and the MSO in support of conventional wireless communications networks. Due to economic, regulatory, and other socio-economic factors, widespread deployment of new or additional physical data communications trunk lines between cell sites and an MSO may not be feasible. In addition, leased line costs for these trunk lines become significant operating expenses when bandwidth demand requires substantial wired link trunk capacity between the conventional cell sites and the conventional MSO. Accordingly, embodiments of the invention are based in part on an observation that minimizing the number of conventional leased lines required for adequately servicing the cell sites for communication with an MSO is a major consideration in providing wireless service to a large number of subscribers.

Conventional techniques for addressing increasing bandwidth demands include adding additional lines and purchasing additional, faster hardware to provide additional throughput on existing lines. Further, conventional data reduction techniques to reduce the message traffic volume include identification and repackaging of transmitted data to reduce message traffic size, including bit compression and other mathematical convolutions to reduce bandwidth requirements. Such conventional approaches suffer from several shortcomings. Latency time to perform the mathematical computations and convolutions for repackaging and unpackaging transmitted data is substantial. Accordingly, a voice user in conventional systems, for example, experiences a noticeable delay in transmission time. Further, conventional approaches do not classify traffic according to type in order to optimize the reduction technique applicable to each type of data. Also, such repackaging may lose certain bits of information which the receiver cannot replicate.

Wireless network demands for both voice and data are consistently increasing as conventional wireless service providers and hardware (wireless phone) manufacturers continually pursue additional applications, services, capabilities and features in user offerings. To support these additional services, a conventional cellular service operator must maintain or often add multiple additional leased lines, typically in the form of terrestrial, microwave, HDSL, or other multiples of T1/E1 channelized aggregates (i.e. n*2.048 Mbps) to each cell site from an MSO in order to maintain sufficient bandwidth for the increased data communications requirements. Further, such conventional cell sites often have a requirement to support many different types of message traffic, including so called 1G, 2G, 2.5G, and 3G traffic, each of which may require a conventional dedicated land-line trunk link from the BTS/BSC to the switching office.

Typically, therefore, a conventional wireless operator maintains such a dedicated link for each type of supported message traffic between each cell site supported by a MSO. As an example, if an operator configures a conventional cell site to support both 2G and 3G wireless communications protocols, that operate must provide dedicated high speed trunk communications links for each type of traffic to the MSO from each cell site in that operators network. Further, multiple redundant links for each traffic type (e.g., multiple 2G and 3G links) may be required between conventional cells sites and conventionally equipped MSOs to support peak demand with acceptable user response. With the modern trend of bandwidth-hungry wireless applications, such as digital voice, video phones, wireless Internet, and other high-bandwidth and real-time applications, the demand for low latency, low error rate wireless links increases. Accordingly, embodiments of the invention provide wireless operators with bandwidth reduction techniques including low-latency lossless compression to mitigate the expense of leasing or adding additional lines between cell sites and an MSO to keep up with subscriber demand.

Embodiments of the invention, therefore, provide an apparatus, systems, and methods for efficient optimization of the use of conventional leased lines between cell sites and an MSO, particularly during periods of peak usage, without compromising the service level to subscribers. Various configuration of the invention, as disclosed herein, provide bandwidth reduction techniques applicable to a plurality of leased lines (links or trunks) between an MSO and corresponding cell sites to allow acceptable similar performance as compared to conventional cell site-MSO system configurations, but using fewer leased lines than such conventional systems, thereby mitigating operating expenses to wireless operators by permitting the wireless operators to provide the same bandwidth (throughput) between the cell site and the MSO on fewer leased lines. Such techniques, such as low-latency lossless compression, provide flexibility for trade-offs between the degree of reduction, or compression efficiency, against latency.

Cell sites typically support a plurality of protocols (e.g., data, voice, signaling) over various data communications mediums (e.g., ATM, IP or TDM links). Often, such protocols employ data items (e.g., periods of silence or idle portions of communication) and control information (e.g., redundant signaling information) that is duplicative, redundant, and/or sparse. Accordingly, embodiments of the invention provide the ability to identify and eliminate transmission of unneeded, redundant or duplicative payload data (e.g., silence or idle frame data) and control information (e.g., redundant signaling information) over the data communications link(s) that exist between a cell site and an MSO. The data representing such duplicative, redundant, and/or sparse transmissions is replaceable with placeholders and tag fields which, according to a predetermined protocol providing a common data or packet format, allows the placeholders to convey regenerable information which is deduceable at a receiving side without actually having to transmit such data.

Generally, embodiments of the invention provide an access gateway data communications device that operates in both a cell site and an MSO. The access gateway device of this invention is a computerized device that optimizes the bandwidth utilization of 2G and 3G mobile data communications traffic sent on the data communications trunk lines of links between a cell site and MSO equipped with the access gateway. As an example, an access gateway device of this invention operates to aggregate or multiplex, via bandwidth reduction (i.e. lossless compression) mobile traffic from multiple cell site services into a common packet format and can transmit this common packet format onto a trunk line using, for example, time division multiplexing (TDM) for receipt by another access gateway configured according to embodiments of the invention that operates in the receiving MSO.

The receiving access gateway performs a reverse operation in order to receive the common packet format traffic and uncompress, un-aggregate and un-multiplex the common packet format into the data streams as originally received by the access gateway prior to processing in the cell site. Within an MSO, the access gateway of this invention operates to terminate the common packet format streams from multiple cell sites that each operate an access gateway of this invention. In other words, the MSO gateway of this invention process the traffic from each cell cite (i.e., the traffic formatted according to this invention) and reconstructs the original frames and channels which the MSO then delivers to conventional base station controllers or, when applicable, to 3G radio network controllers.

Accordingly, embodiments of the invention can operate to identify regenerable information in message traffic between a cell site and an MSO. Once identified, embodiments of the invention can represent such regenerable information in a format that allows a recipient device (e.g., the MSO if sent from the cell site, or the cell site if sent from the MSO) to reproduce such information in order to recreate the original stream of message traffic in a lossless manner. Such regenerable information corresponds, for example, to control information and data which is representable in alternate forms such that it need not be transmitted in its entirety in order to be replicated at the receiving side.

Further, configurations of the invention perform the lossless bandwidth reduction coupled with low latency, in a manner specific to the type of data. Conventional approaches receive an entire unit, such as a packet, of data prior to commencing analysis for bit compression, and then receive the entire packet at the receiving side prior to reversing the bit compression. Accordingly, such conventional approaches suffer from a delay (latency) of at least two times the time required to receive a unit (packet) of data. In the present invention, the low-latency bandwidth reduction classifies incoming data before receiving an entire frame, operating on data sufficient to classify and determine applicable bandwidth reduction techniques. Further, the receiving backhaul gateway begins reproducing the original data without waiting for an entire frame, but rather, when sufficient data (bits) are received. Accordingly, perceptible latency by a user is minimized.

As a specific example of operation of embodiments of the invention, audible speech transmissions represented by a wireless data communications protocol typically include many portions (e.g., frames) of silence (subtle background sounds represented as silence frames) and idle time (e.g., null frames) within which meaningful voice signals are not present as data. Embodiments of the invention can operation to reduce or eliminate the full representation such silence portions or idle signals from transmission in data between the cell site and the MSO. Within the receiving MSO, embodiments of the invention can then operate to receive and reproduce the silence or idle (null) signals or frames in order to re-create the original data communications signal. As another example, conventional cell sites may transmit a signal to an MSO containing certain types of redundant signaling information, such as data flags and toggles or bit stuffing that may be repeated in message packets. In some cases, once such flags or toggles are set, they are only significant when they change in value. Between such state changes, conventional cell site and MSO communications represent such signaling information as frames, even though those frames do not contain meaningful information (since no change occurs to the toggles or data flags). Embodiments of the invention can strip out or remove this type of redundant signaling information on the sending end (e.g., within a cell site) and can include this redundant information when it does indicate a change. In particular, configurations disclosed herein perform such aggregation in a low latency manner via the following. Performing a dynamic analysis of A.bis links (typically a leased T1 link for wireless traffic), so channel links need not be pre-provisioned and can react automatically if the BTS or BSC restarts with new DS0 channel assignments for A.bis traffic. The backhaul gateway achieves this via in-band analysis of individual DS0s (and sub-rate channels the timeslot 0 channel of E1 as a special case) within a 1.5 or 2 Mbps A.bis interface. Further analysis concerns the entire pipe, if there's a chance it might be an Iub interface The backhaul gateway monitors the signaling channel or other signals that could indicate a rechannelization event.

Configurations herein identify rechannelization and thus solve the 2G/3G problem by multiplexing compressed A.bis data with Iub ATM cells in combination with compression, and further perform such operations in one or more of the following non-ATM fashions: the use of proprietary links where Iub and other non-A.bis data is uncompressed data that is time sliced and forwarded in an independent proprietary format (variable length HDLC-like packets); and also using the T1/E1 framing as the lowest layer protocol, i.e. using T1/E1 framing instead of ATM cells as a fixed size lower layer; and finally, perform Inverse Multiplexing over ATM (IMA) with ATM or a proprietary equivalent of link sharing with the proprietary approach.

Further reduction in latency is provided by sending frequent bundles of data (for many channels per data bundle) so as to reduce latency, where compression is done by maintaining separate state machines per channel, only sending data for channels that are active, and identifying A.bis TRAU frames and only sending the useful portion of the data as determined on a per-frame basis.

Configurations include distinguishing between voice and data+signaling, so as to optimize for multiplexing advantages and avoid the risk of lost speech during voice activity bursts, by temporarily delaying data or signaling traffic when necessary to let all the voice get through. Further, aggregated transmissions perform inclusion of address info, in one or more minimalist fashions, within the compressed packet so we are able to recover from link errors, employ FEC to reduce link errors so we can reduce the amount of address information we send with each channel, and perform monitoring of link error rates and changing FEC operating mode if the error rate goes above a preset threshold.

More specifically, particular configurations of the invention provide a wireless access gateway operable to aggregate redundant and regenerable data in the backhaul link between a wireless cell site and the corresponding mobile switching office (MSO). A pair of wireless gateway access devices of this invention operates in each side between high speed trunk lines, such as E1 and T1 links, connecting the cell site and the MSO. The wireless gateway device receives the wireless data and classifies the data according to traffic type. Examples of different traffic types can be 3G, 2G or other types of traffic. Based on the traffic type, the access device identifies regenerable information and eliminates portions of the data which the device need not transmit because the data is redundant, or accessible or recreatable, at the complementary wireless gateway device at the receiving side. The access device formats the reduced message traffic data without the regenerable portions, and transmits the message traffic over the high speed trunk. The receiving gateway device also operating according to embodiments of the invention identifies the message traffic type and the regenerable information to recreate the original wireless data from the regenerable information received in the reduced data format. In this manner, the access device of this invention reduces bandwidth over the high speed trunk lines, allowing fewer lines to carry the reduced message traffic by transmitting only the non-recreatable data and eliminating message traffic for regenerable information.

The gateway access device, by reducing the amount of data to transmit over the high speed trunk(s) between the cell site(s) and the mobile switching office, can delay or eliminate the expense of adding additional high speed trunk lines between the cell site and the MSO. For example, if a particular installation employs three T1 lines between a cell site and an MSO, a pair of access devices configured according to this invention, that are disposed between the cell site and the MSO, can achieve a 35% reduction in message traffic volume through reduction and elimination as explained herein. As a result, embodiments of this invention can alleviate the need for one of the T1 lines and thus save a network operator significant investment in capital resources. Therefore, two T1 lines between the access devices are operable according to the invention to carry the reduced, aggregated message load without the regenerable information which formerly required (using conventional configurations that do not include embodiments of the invention) three T1 trunk lines.

In further detail, the wireless gateway access device (e.g., a backhaul gateway in a particular cell site) of this invention is operable for aggregating and reducing network message traffic by identifying regenerable information in the message traffic at a sending side. The regenerable information includes data content in the message traffic reproducible at a receiving side from information accessible at the receiving side. The sending access gateway eliminates the identified regenerable information to reduce the volume and associated bandwidth requirements of the remaining message traffic to provide overall reduced message traffic (i.e., lower bandwidth). The access gateway of this invention then employs a backhaul protocol to frame the remaining message traffic according to predetermined formatting logic (e.g., a common packet format). The formatting logic provides transmission of the remaining reduced message traffic and supports regeneration of the reproducible data content from the identified regenerable information at the receiving side (e.g., within an access gateway in the MSO).

The message traffic includes message traffic packets. The operation of identifying the message packets further includes examining, in a classifier (provided in embodiments of this invention), portions of the message traffic packet indicative of a message payload carried in the message traffic packet, and further includes comparing, in the classifier, the portions of the message traffic packet to a predetermined set of expected message traffic types. Message traffic types can include, for example, 2G or 3G traffic. Classification logic in the classifier, then classifies, or selects, the message traffic type. The message traffic type is indicative of the regenerable information in the message traffic packet since each traffic type is formatted according to a predefined standard associated with that message traffic type.

Eliminating the identified regenerable information to reduce transmission bandwidth (volume) further includes mapping the message traffic to reducing logic. The reducing logic has reducing rules based on a message traffic type. This embodiment identifies, based on a match between the message traffic type and the reducing rules, the regenerable information, in which the reducing rules correspond to the message traffic type. The backhaul gateway of this invention then applies the selected reducing rules to the message traffic to generate a reduced message. The reduced message includes the remaining information in the message traffic without the regenerable information (i.e., the regenerable information is either absent from the reduced message completely, or is represented in a compressed or reduced form that a recipient access gateway can utilize to regenerate or reproduce the regenerable information in its unreduced, uncompressed form).

In addition to the aggregation and reduction performed by the bandwidth reduction engines, various error correction and/or authentication operations may be applied to the aggregated, reduced date. For example, Forward Error Correction (FEC) encoding may be applied to the header portion, data payload portion, or a subset or combination thereof.

Framing the reduced, aggregated message traffic for transmission according to the formatting logic of the backhaul protocol of this invention further includes identifying, according to the formatting logic, the non-recreatable portions of the message traffic, and storing, in a message traffic packet, the remaining message traffic. The remaining message traffic includes non-recreatable portions of the message traffic. The backhaul gateway then stores, in the message traffic packet, an indicator corresponding to the regenerable portion of the message traffic packet. The reducing logic at the receiving end is responsive to the indicator to reproduce the regenerable portions of the message traffic. In this manner, redundant original traffic can be represented in a compressed format by an indicator that the recipient access gateway can use to recreate the original traffic.

The framing in the backhaul protocol, in a particular configuration, further includes formatting, according to the formatting logic, the remaining message traffic into a message packet format. The message packet format has a common protocol format (backhaul protocol or common packet format) provided according to the formatting logic and is applicable to a plurality of message traffic types. The common protocol format is operable to be transmitted to the receiving side for recovering or recreating the original message traffic.

Receiving the backhaul protocol traffic at an opposed (receiving) side of the backhaul link further includes, in a particular configuration, receiving a plurality of reduced data streams according to (i.e., formatted in) the common protocol format. The common protocol format is encoded as formatting logic at the receiving side that receives the reduced data streams. The receiving backhaul gateway unframes, according to the formatting logic, the reduced data streams according to the backhaul protocol format, and identifies, from the aggregation rules in the reducer, regenerable information corresponding to the received reduced data. The backhaul gateway reproduces, based on the identified regenerable information, the reproducible data content eliminated at the sending side, and regenerates, by integrating the reproduced data content with the remaining message traffic, the original message traffic including the reproducible data content. The backhaul gateway then forwards the original message traffic to an intended remote receiver by classifying, in the classifier, the type of message traffic of the original message traffic integrated with the reproducible data content. This operation typically occurs in the MSO, though it is to be understood that the operations of the invention can occur in all traffic from cell site to the MSO, as well as in traffic from the MSO to a particular cell site.

In a particular configuration such as used in a cell site, the backhaul gateway transmits speech data from wireless phones. The transmission of speech data further includes identifying segments of speech data in the message traffic. The speech segments have a header including a vocoder field indicative of a vocoder, and a content portion corresponding to speech data. The transmission includes demarcating segments of the speech data corresponding to voice, silence, and idle content portions.

The speech data processing further eliminates reproducible speech data by reducing, if the speech data segment corresponds to silence, the duration of the silence content portion. This is done in one embodiment by including only a portion of the speech data segment, and eliminating, if the speech data segment has an idle content portion, the idle speech data segment from the non-recreatable data content item. In addition, if the speech data segment has a voice content portion (i.e., that must be included as it cannot be reproduced from a compressed format on the receiving side), the voice speech data segment is processed as a non-recreatable data content item.

In another particular configuration, the backhaul gateway is operable to reduce and aggregate signaling data by analyzing the data content for data content segments including signaling data by eliminating control fields corresponding to control information specified in previous signaling data content segments. Such signaling data may further include, by way of example only, high-level data link control (HDLC) information operable to provide wireless signal control for at least one of signaling channel selection, power control, reception levels, number dialed, bit padding, keep alive indicators, and control flags.

Such signaling data, in a particular configuration, arranges control according to a layered stack, in which the layers correspond to mapping and partitioning control, and to data content fields. The layers further include: a receiving layer operable to receive data from a user application; a selection layer operable to analyze the data in the receiving layer and to select data adapted to be transmitted; an efficient optimization layer operable to aggregate and reduce the data adapted to be transmitted (i.e., the aggregating and reducing resulting in a lower volume of data for transmission); and a transport layer operable to transmit a bit-exact payload corresponding to the aggregated and reduced data from the efficient optimization layer.

In another particular arrangement, the backhaul gateway performs traffic shaping, or prioritization and overload management to accommodate priority based on loss tolerance of the reduced and aggregated transmissions. The gateway of this invention provides such traffic shaping by computing an urgency factor corresponding to the reduced message traffic. A framer, responsive to the urgency factor, determines the transmission order for formatted message traffic. The system operates to prioritize outgoing message traffic from the framer according to the priority. The priority is based on a predetermined delay tolerance of the data content type. The reducer, using reducing logic, modifies the outgoing traffic, for example, by adjusting compression parameters corresponding to a degree of reduction. In traffic shaping, if the access gateway of this invention senses that maximum bandwidth use is approaching, the access gateway is able to inform upper layer protocols that the link between the cell site and MSO is being highly utilized and that these upper layer protocols are to take steps to mitigate the amount of traffic being sent to the access gateway.

In another arrangement, the backhaul gateway is operable to reduce and aggregate ATM (Asynchronous Transfer Mode) transmissions by identifying message traffic having a fixed packet size and having a header corresponding to a particular circuit and replacing the header with an efficient header having a shorter length and corresponding to an alternate replacement circuit from a smaller set of available circuits. Further, the gateway detects ATM padding and idle cells for maintaining cell alignment in the absence of payload data, since such padding and idle cells are recreatable at the receiving gateway. In this manner, if the access gateway in a cell site receives ATM cell streams, such streams can be aggregated and redundant or reproducible portions can be eliminated and represented by smaller portions of data in the common protocol format provided by embodiments of this invention.

In another configuration, the backhaul gateway provides fault-tolerant operation via an automatic failover operation. The failover operation involves detecting an operability condition of the backhaul gateway serving one of the sending and receiving sides. The backhaul gateway identifies a number of operational lines between the sending and receiving sides (e.g., multiple lines between the access gateways in a cell site and an MSO), and selects a number of available incoming lines to the sending side of the backhaul gateway to remain in service as failover lines (i.e., in the event of a failure of the access gateway). In the event of a failure of the access gateway, for each available line remaining operational, the backhaul gateway automatically maps the failover lines to a particular operational line between the sending and receiving sides, either through a configuration specified selection or automatic selection from available operational lines. Synchronization with the complementary backhaul gateway occurs by informing the complementary sending or receiving side (i.e., the access gateway that was in communication with the now failing or failed access gateway) of the operability condition (i.e., of the failure), and subsequently routes traffic received on each of the failover lines to the corresponding operational line. In this manner, if an access gateway for example in a cell site fails for some reason, one or more of the cell tower links (e.g., providing 2G, 3G, etc. traffic into the access gateway for aggregation) can be selected to be bypassed around the access gateway in the event of the failure. Such traffic would no longer be processed into the compressed format, but communications could continue for those lines selected for failover protection. The receiving access gateway in the MSO (i.e., that did not experience the failure) can sense the failed access gateway (e.g., via loss of a heartbeat or other periodic signal) and can likewise discontinue processing of aggregated common protocol format packets and can begin to channel the uncompressed "conventional" traffic through the access gateway without the de-multiplexing operations explained herein. In this manner, even though a failure occurs, the failed access gateway does not completely compromise all communications.

The features of the invention, as described above, may be employed in systems, data communications devices and methods, as well as other computer-related components such as those of NMS Communications, Inc., of Framingham, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 9 shows the format of the aggregation rules in the backhaul gateway device of FIG. 4 in greater detail.

FIG. 11 shows a typical payload dispersion over channels;

FIG. 12 shows an aggregated payload of selected channels;

FIG. 13 shows the bit framing of compressed, aggregated message traffic on a channel;

FIG. 14 shows channel framing omitting recreatable data using framing as in FIG. 13;

DETAILED DESCRIPTION

Figure 1:
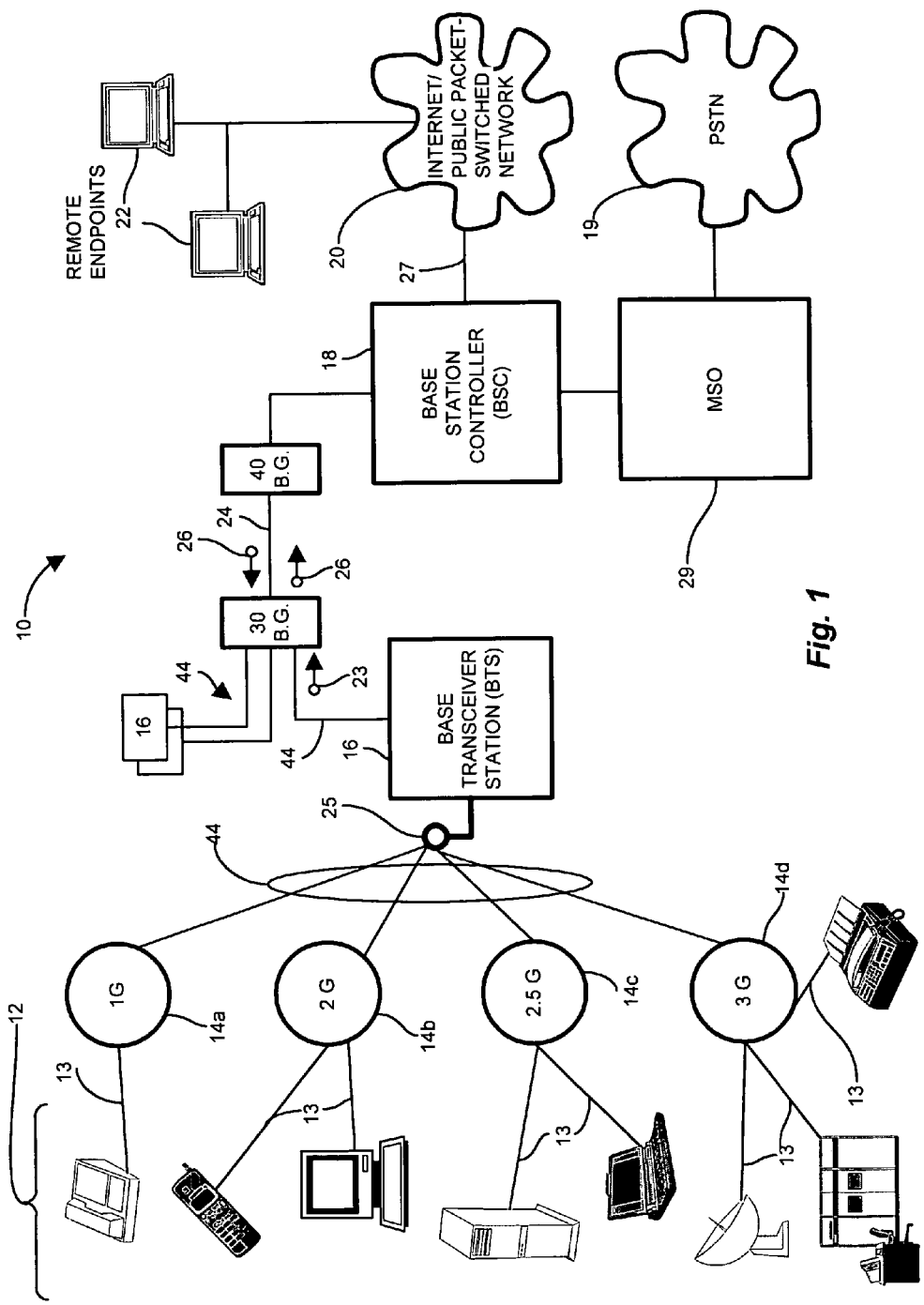
FIG. 1 is a context diagram of a communications network which is suitable for use with the present invention employing a backhaul link supporting wireless communications as defined herein.

Embodiments of the invention provide a wireless access gateway operable to aggregate redundant and regenerable data in the backhaul link between a wireless cell site and the corresponding mobile switching office (MSO) and provide low-latency type-specific lossless bandwidth reduction. In one configuration, a pair of wireless access gateway devices of this invention operates on each side of the backhaul link between (i.e., coupled by) one or more high speed trunk lines, such as E1 and T1 links, connecting the access gateway in the cell site and the access gateway in the MSO. The wireless access gateway (also referred to herein as a "backhaul gateway") device of this invention receives one or more streams of wireless data (e.g., 2G or 3G data) and classifies the data according to traffic type. Based on the traffic type, the backhaul gateway device identifies regenerable information in the data stream(s) and eliminates portions of the data that the device need not transmit because the data is redundant, or accessible or is re-creatable, at the complementary access device on the receiving side. The backhaul gateway device of this invention formats the reduced message traffic data without the regenerable portions, and transmits the reduced message traffic over the high speed trunk (i.e., to the receiving access gateway). The receiving backhaul gateway device receives this compressed or reduced traffic and identifies the message traffic type, and then identifies the regenerable information to recreate the original wireless data from the regenerable information in the reduced data format. In this manner, the backhaul gateway device of this invention reduces bandwidth required over the high speed trunk lines linking cell sites to MSOs, thus allowing fewer lines to carry the reduced message traffic by transmitting only the non-recreatable data and eliminating message traffic for regenerable information.

The backhaul gateway device, by reducing the amount of data to transmit over the high speed trunk between the cell site and the mobile switching office, can, in some cases, eliminate or postpone the need for some of the physical lines between the cell site and the MSO. For example, if a particular installation employs three T1 lines between a cell site and an MSO, a pair of backhaul gateway devices of this invention disposed between the cell site and the MSO can achieve a 35% reduction in message traffic volume through reduction and elimination. This alleviates the need for one of the T1 lines and saves to network operator considerable capital resources. Therefore, two T1 lines between the backhaul gateway devices are operable to carry the reduced, aggregated message load without the regenerable information which formerly required three T1 trunk lines (i.e., in a system not equipped with embodiments of the invention).

The backhaul gateway device of embodiments of this invention repackages, according to formatting logic, the original message traffic received from a wireless subscriber by the cell site or received at the MSO and addressed to such a wireless subscriber. The backhaul gateway at the sending side identifies regenerable information, eliminates the recreatable data that this information corresponds to, and repackages (frames) the message traffic according to the common protocol format (or common packet format). The backhaul gateway on the receiving side of such common protocol format traffic operates in a complementary manner to unframe the message traffic in the common protocol format and recreates the data eliminated on the sending side, using the common protocol format and the identifiable regenerable information. The receiving side thus reproduces the message traffic as a packet similar to the form in which the sending backhaul gateway device received the original message traffic packet. Accordingly, the backhaul gateway device of embodiments of this invention is a bi-directional communications device operable to convert conventional 2G and 3G wireless traffic into the common protocol format as described herein for transmission between cell sites and an MSO (in both directions). The examples and description herein refer to a sending side and a receiving side, and should be taken to mean message traffic in either the uplink (from the wireless subscriber to the wired network) direction or the downlink (to the wireless subscriber) direction.

In further detail, in a general operational manner, the backhaul gateway provides data type specific, lossless bandwidth reduction in the manner outlined below. The specific bandwidth reduction technique depends on the type of the data traffic (i.e. frame, packet or cell, as the case may be). Such specific techniques for exemplary instantiations of the more common data types are discussed in the figures and accompanying discussion that follow. Other and analogous type specific bandwidth reduction techniques will be apparent to those skilled in the art.

In a general manner, the backhaul gateway has the ability to perform lossless compression with low latency and further, the ability to trade-off compression efficiency against latency for optimal performance. The backhaul gateway, in operation, instantiates flow-specific state machines on each distinct traffic flow (e.g. traffic type). For example, there are instantiations of different state machines for GSM voice channels, GSM signaling channels, 1G traffic, and either ATM cells in general or specific ATM flows (i.e. ATM virtual circuits tracked by the kinds of information being sent over them).

Each kind of state machine is optimized to identify where redundant information exists in its corresponding flow, with the state machine entering a separate state when a redundant frame or block of information is identified. Note there may be several different forms of redundant information in a specific flow. If so, these are represented by several different states. The classifier, described below, determines the traffic type and hence, the state machine to which a particular data item (frame, packet, cell) corresponds.

Each state machine processes the corresponding traffic type (flow) as directed by the aggregation processor via the classifier. At either fixed time intervals, or on a data-driven basis (i.e. driven by changes in one or more state machines), the aggregation processor combines:

a) the exact bits from each flow that is not in a redundant state b) a state change indication for each of those flows (channels) that have changed state since the last interval c) zero bits for those channels that are currently in a redundant state (and haven't changed state since the last interval).

The rate of such combination by the aggregation processor provides the granularity in the efficiency to latency balancing for optimal performance.

FIG. 1 is a context diagram of a communications network that is suitable for use with the present invention employing a backhaul link supporting wireless communications as defined herein. Referring to FIG. 1, the exemplary communications network 10 includes a plurality of subscriber 12 devices, or customer premises equipment corresponding to a plurality of subscribers 14a-14d (14n generally). Each of the subscribers 14n employs a particular type of connection class (1G, 2G, 2.5G and 3G) via wireless links 13, as shown by the subscribers 14a-14d respectively. The system 10 further includes at least one base station transceiver (BTS) 16 (several shown in this example), each having a wireless antenna 25 and a data communications link 44 (e.g., a T1, E1, A.bis or other high speed data communications link) to a backhaul gateway 30 configured in accordance with embodiments of the invention. Message traffic 23 from each BTS is sent over the data communications link 44 to the backhaul gateway 30 for transmission over a backhaul link 24 to a corresponding backhaul gateway 40 that operates in conjunction with a base station controller 18 (BSC). Each backhaul gateway 30, 40 communicates using message traffic 26 in a common protocol format as will be explained. Remote endpoints 22, accessible via a network 20 such as the Internet (or other communications network, such as a Public Switched Telephone Network 19), provide a connection to the BSC 18.

In the exemplary network 10 shown in FIG. 1, each of the subscriber devices 12 operates using wireless communication with the BTS 16 via the antenna 25 using one of the connection classes 14n discussed further below. The BTS sends and receives wireless signals to and from the subscriber devices 14n, and transmits communications 23 to and from the backhaul gateway 30 over links 21. The backhaul gateway 30 typically connects to a plurality of BTSs 16, each located as a cell site in the field. The BSC 18 connects to the Internet 20 or a PSTN 19 via an Internet backbone or other data communications trunk 27 for communication with remote endpoints 22

(e.g., other computers or phones). The backhaul link 24 typically carries message traffic packets 26 corresponding to many different types of message traffic, depending on the messages and protocols of the different subscriber devices 12.

In operation, the connection classes of the subscribers 14n (e.g. subscriber, or user, operated devices, also known as terminal equipment or customer premises equipment) refer generally to the types of data communications technology which the BTSs 16 transmit as message traffic 23 to and from the backhaul gateway 30 over high speed links 44, and may include any type of wireless communications known in the industry to those of skill in the art. Generally, in this example these classes of message traffic 23 are as follows: 1G includes analog voice signals in digitized G.711 form; 2G refers to digital voice and circuit-switched data; 2.5 corresponds to digital voice and packet-switched data; and 3G refers to advanced and/or high bandwidth multimedia communications, such as color screen phones that can communicate digital data including voice, video, pictures, and other types of messages.

Generally, embodiments of the invention operate, in this example, as the corresponding pair of access gateway devices (i.e., backhaul gateways) 30 and 40 operating, respectively, in conjunction with the base transceiver stations 16 (of which there may be many per backhaul gateway 30) and the base station controller 18. The backhaul gateways 30 and 40 are operable to receive, as will be explained herein, the data communications traffic 23 from the various BTSs 16 for transmission in a common protocol format as data communications traffic 26 over the backhaul link 24 to reduce or minimize bandwidth requirements of this backhaul link 24.

Figure 2:
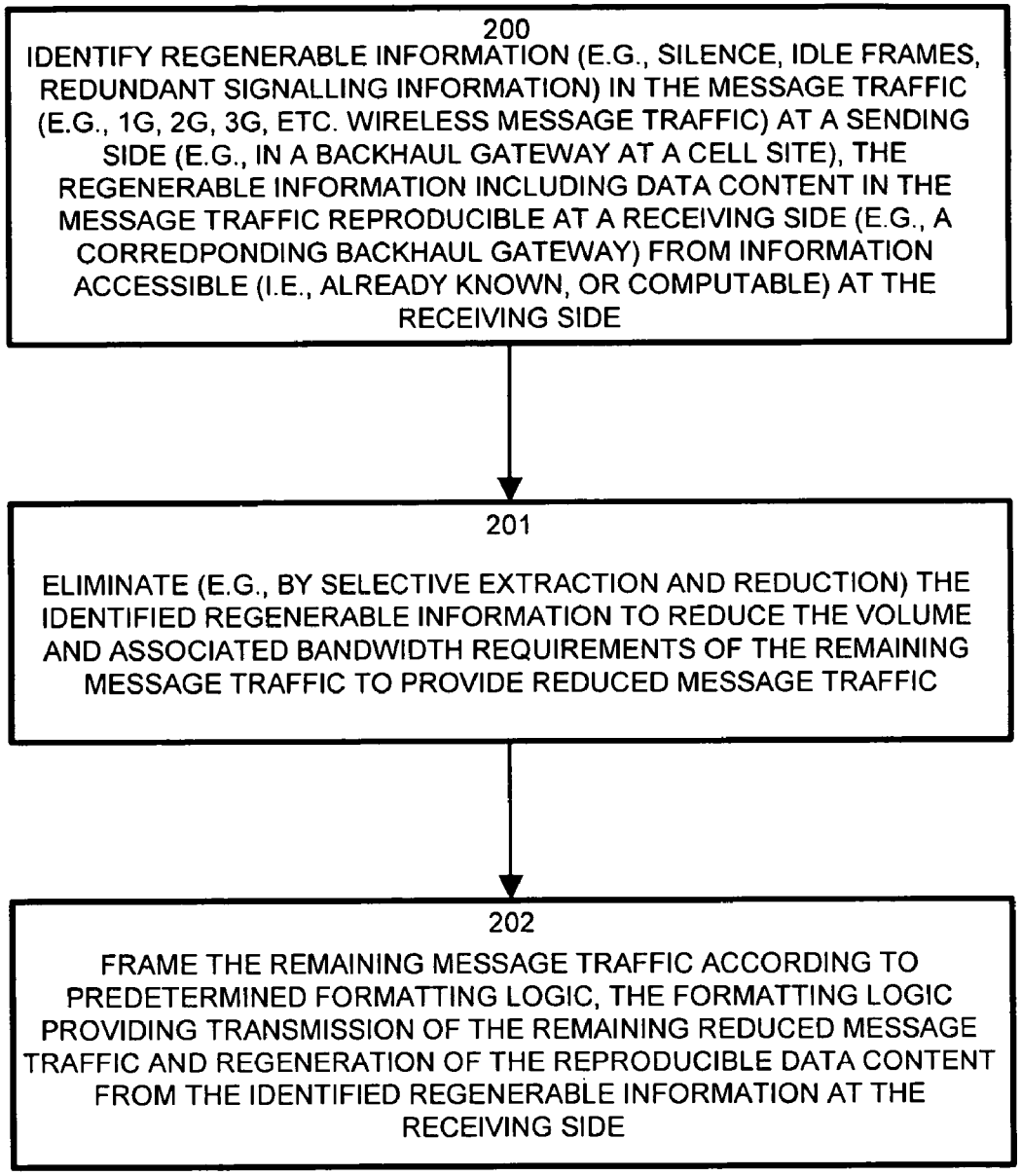
FIG. 2 is a flowchart of a method for aggregating and reducing message traffic across the backhaul gateway device of FIG. 1.

FIG. 2 is a flowchart of a method for aggregating and reducing message traffic across the backhaul link 24, as performed by a backhaul gateway 30 of FIG. 1. Referring to FIGS. 1 and 2, at step 200, the BTS 16 (i.e., operating the backhaul gateway 30) at a cell site 28 (FIG. 3, below) on a sending side identifies regenerable information in the message traffic 23 (i.e., traffic 23 originating from user devices 12 and sent from the BTSs 16 to the backhaul gateway 30) at the sending side. The regenerable information includes data content in the message traffic 23 reproducible at a receiving side from information accessible at the receiving side, or that the receiving side backhaul gateway 40 can reproduce based on communications 26 formatted in the common protocol format of this invention. The backhaul gateway 30 receives message traffic 23 in an uplink direction, towards the BSC 18, and identifies information therein which can be regenerated at the receiving side backhaul gateway 40.

At step 201, the cell site eliminates the identified regenerable information to reduce the volume and associated bandwidth requirements of the remaining message traffic to provide reduced message traffic. The reduced message traffic is message traffic which the cell site has eliminated, or extracted, from the message to reduce the resulting volume of the reduced message traffic for transmission. Accordingly, fewer transmission resources are needed to transmit.

At step 202, the backhaul gateway 30 employs the backhaul protocol to frame the remaining message traffic 23 according to predetermined formatting logic (to be explained). The formatting logic provides transmission of the remaining reduced message traffic 26 and regeneration of the reproducible data content from the identified regenerable information at the receiving side 40. The formatting logic in the backhaul gateway 30 specifies the semantics and structure of the backhaul protocol, and is applicable to the various message traffic 23 types which the backhaul gateway 30 receives, described further below. The backhaul gateway 30 then transmits the formatted message traffic 26 (i.e., formatted in the common protocol format or backhaul protocol) to the complementary backhaul gateway 40 for transmission to the BSC 18 at the other side of the backhaul link 24.

Figure 3:
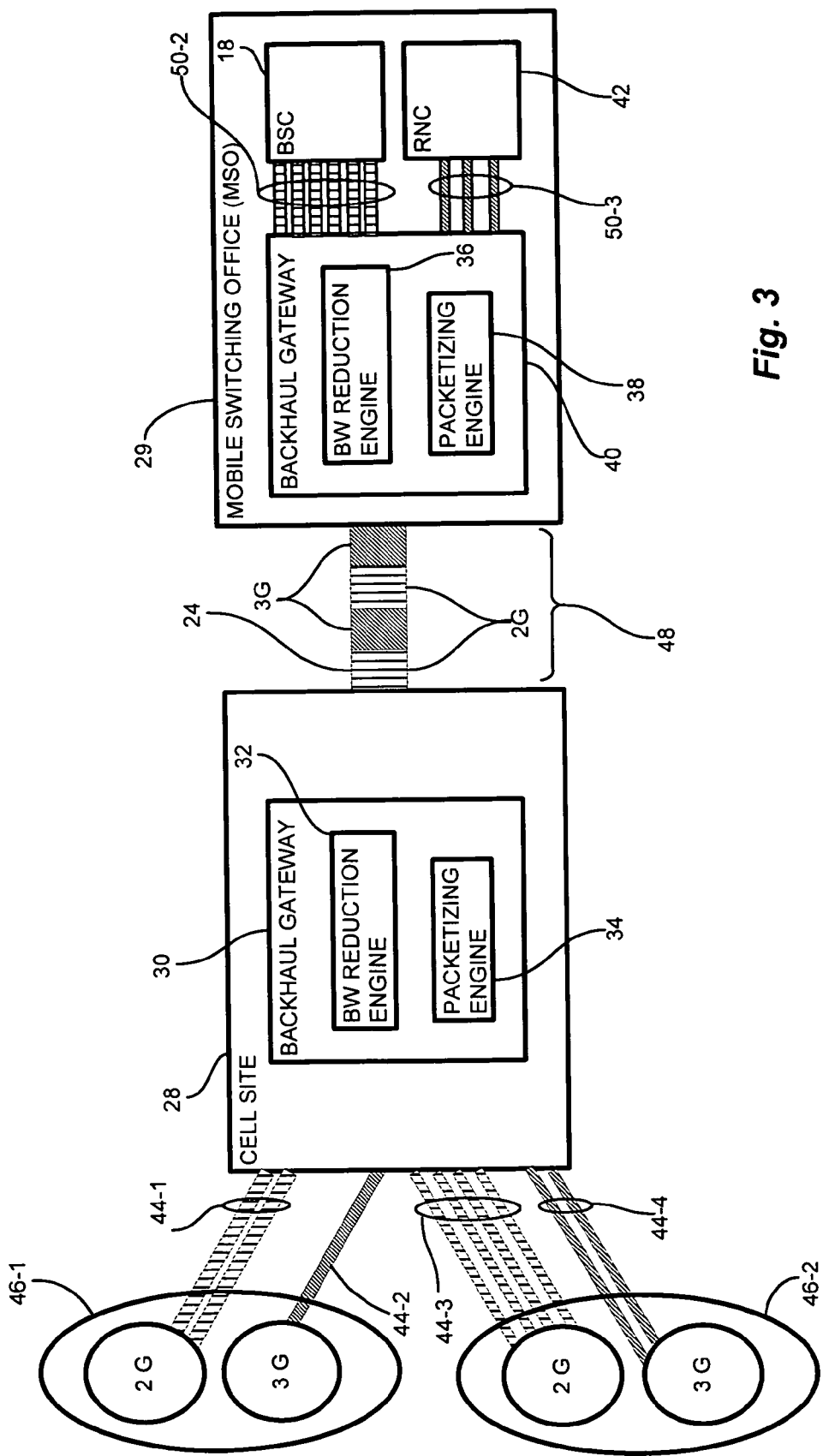
FIG. 3 shows a block diagram of backhaul gateway devices as defined herein interconnecting the backhaul link of FIG. 1.

FIG. 3 shows a block diagram of backhaul gateway devices 30, 40 as defined herein interconnecting the backhaul link 24 of FIG. 2. Referring to FIG. 3, the cell site 28 includes a backhaul gateway 30. The backhaul link 24 connects to a mobile switching office (MSO) 38 including a backhaul gateway 40 on the uplink side toward the wired network. The MSO 38 includes the BSC 18 and a radio network controller (RNC) 42 for receiving ATM message traffic, discussed further below. Alternatively, depending on the network demand, both the BSC and RNC may not be required, as a 2G implementation may require only a BSC or other similar device. Each backhaul gateway 30, 40 includes a bandwidth reduction engine 32, 36 and a packetizing engine 34, 38, respectively. The cell site 28 may maintain a plurality of traffic type specific links 44 to antenna sites 46-1, 46-2 (46 generally). Each of the antenna sites 46-1, 46-2 represents a BTS 16 (as shown in FIG. 1) that uses antennas 25 for maintaining wireless links 13 for the types of traffic it carries. Exemplary 2G 14b and 3G 14c traffic types are shown for clarity, however other traffic types as shown in FIG. 1 are supportable.

The cell site 28 connects to the antenna sites 46 (arrays) via the wireless links 44. In the example shown, the cell site 28 employs 2 2G links 44-1 and 1 3g link 44-2 to the antenna site 46-1. Similarly, the site 28 employs four 2G links 44-3 and two 3G links 44-4 to the antenna array 46-2.

In operation, the wireless links 46 provide connections from each of the antenna sites to the cell site 28. The wireless links 46 transmit message traffic corresponding to the end user wireless links 13 (FIG. 1) and adhering to a wireless protocol, such as GSM, GPRS, WCDMA, and other protocols as are know to those skilled in the art. The BTS 16, or an analogous device, allocates wireless channels and message traffic queuing to accommodate interference, power control issues, and handoffs according to the wireless protocol.

The backhaul gateway 30 operates between the BTS 16 and the backhaul link 24 for reducing message traffic volume. The backhaul gateway includes at least one bandwidth reduction engine 32 and at least one packetizing engine 34, for processing message throughput over the backhaul link 24, discussed further below. The backhaul link 24 carries message traffic 48 according to a backhaul protocol encapsulating data in a common protocol format for aggregating and reducing the message traffic, also discussed further below.

The message traffic 48 over the backhaul link includes the aggregated, reduced traffic 50-2 and 50-3, occupying less bandwidth and operable to be carried on fewer physical lines, than its counterpart, unreduced, message traffic 44. At the remote backhaul gateway 40, in the MSO 29 serving a plurality of cell sites 28, the packetizing engine 38 and bandwidth reduction engine 36 invert the aggregation and reduction of the aggregated backhaul protocol. The backhaul gateway 40, therefore, reframes the message traffic to the original form corresponding to the wireless links 44, and forwards the message traffic 48 to a corresponding BSC 18 for 2G traffic 50-2, or Radio Network Controller (RNC) 42 for 3G traffic 50-3.

Figure 4:
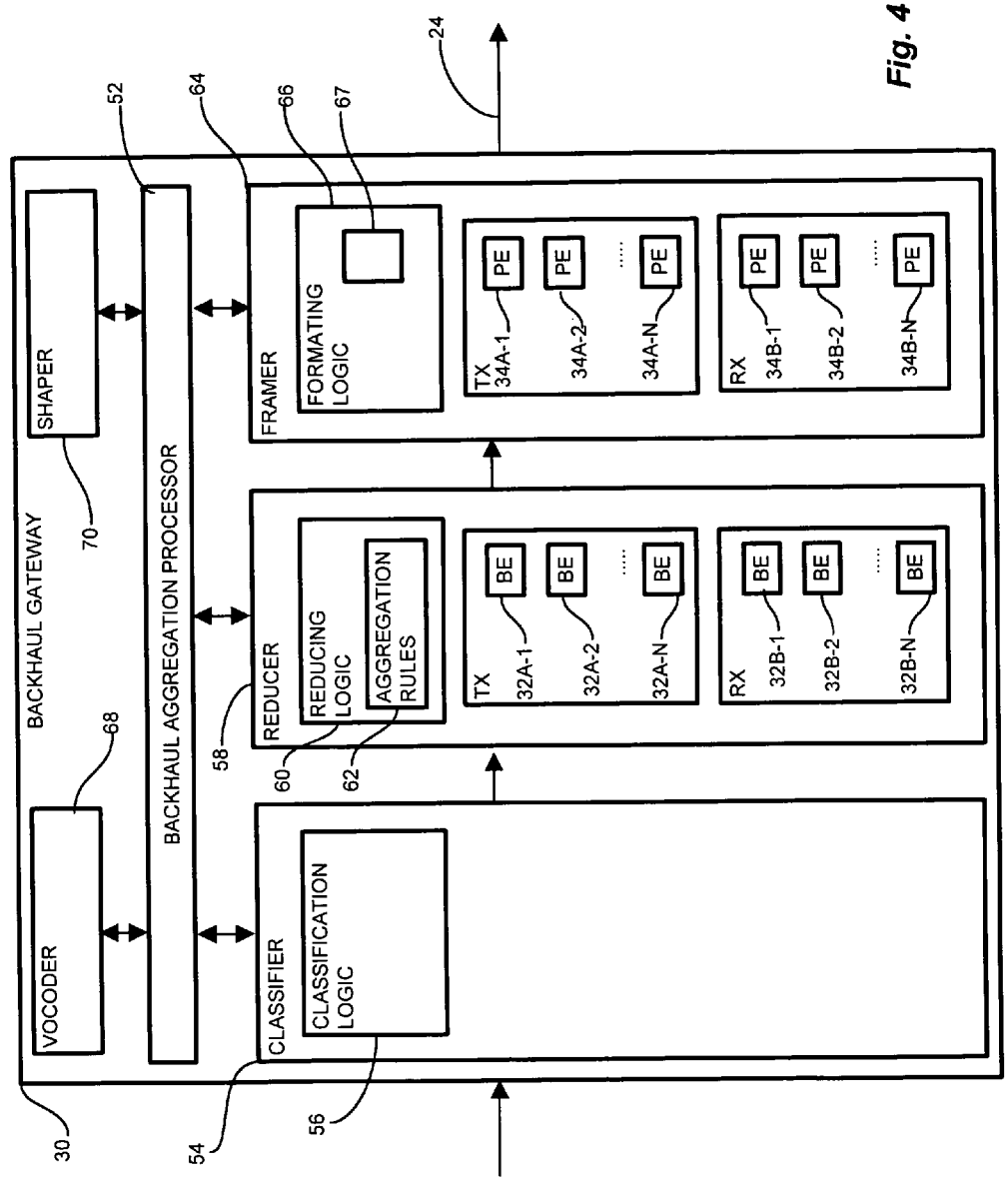
FIG. 4 shows a block diagram of a backhaul gateway device of FIG. 3 in greater detail.

FIG. 4 shows a block diagram of a backhaul gateway device 30 of FIG. 3 in greater detail. Referring to FIGS. 3 and 4, the backhaul gateway 30 includes a classifier 54 having classification logic 56, a reducer 58 including reducing logic 60, aggregation rules 62, and bandwidth reduction engines 32, and a framer 64 having formatting logic 66, including an object instantiating the backhaul protocol 67, and packetizing engines 34. Both the bandwidth reduction engines 32 and the packetizing engines 34 include a plurality of compression 32 and packetizing 34, specifically bandwidth reduction engines 32 for transmission 32A-1 ... 32A-N, and receive 32B-1 ... 32B-N, and packetizing engines 34 for transmission 34A-1 ... 34A-N and receive 34B-1 ... 34B-N. The device 30 also includes a backhaul aggregation processor 52, a vocoder 68 and a shaper 70.

In operation, the classifier 54 receives the message traffic 44 from the BTS 16, and applies classification logic 56 to determine the traffic type of the message traffic 50. Depending on the traffic type, the backhaul aggregation processor 52 applies the corresponding operations and functions to encode and decode the backhaul protocol 67. The backhaul protocol 67, therefore, provides a common packet format between each pair of backhaul gateways 30, 40 for the various message traffic types which travel across the backhaul link 24. The reducer 58 receives the classified message traffic 44, and applies reducing logic 60, depending on the classification. The reducing logic 60 employs aggregation rules 62, described further below, to determine and apply the reduction and aggregation operations to extract and remove recreatable information from the message traffic 44. A vocoder 68 may be employed to operate on speech data types to encode such speech data from a sequence of user message packets corresponding audible (spoken) data, such as reducing digitized G.711 voice from a 1G analog radio system. The bandwidth reduction engines 32A collectively process the data according to the aggregation rules 62. A shaper 70 performs optional traffic shaping during peak demand (throughput) by prioritizing message traffic to the reducer 58 based on delay tolerance for the message traffic type, described further below. The framer 64 receives the reduced, aggregated message traffic 44 from the reducer 58, and frames it into packets according to the backhaul protocol 67. The formatting logic 66 controls the formatting of the reduced message traffic 44 according to the backhaul protocol 67, and invokes the packetizing engines 34A to reformat the message traffic 44 for transmission to the remote backhaul gateway device 40.

The discussion herein focuses on the transmission side of the backhaul gateway device 30. Analogous and complementary operations occur in the backhaul gateway device 40 at the opposed side of the link 24, via the receive bandwidth reduction engines 32B and packetizing engines 34B.

Figure 5:
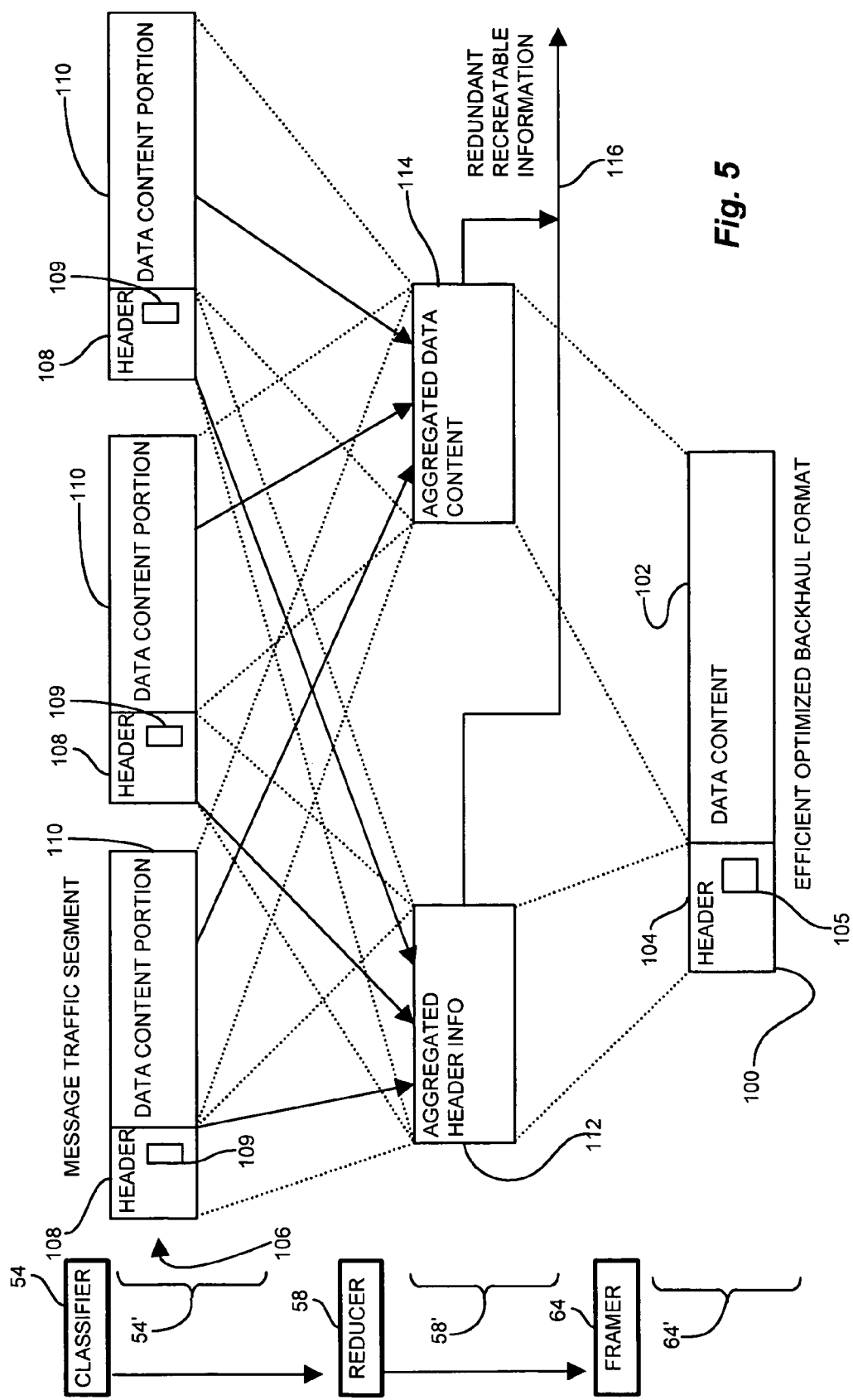
FIG. 5 shows a data flow diagram of mapping, aggregating and reducing message traffic in the backhaul gateway device of FIG. 4.

FIG. 5 shows a data flow diagram of mapping, aggregating and reducing message traffic in the backhaul gateway device of FIGS. 3 and 4. Referring to FIGS. 4 and 5, the backhaul gateway 30 receives message traffic 44, in a particular arrangement, as a sequence of message packet segments 106, or message traffic packets, as in GSM TRAU (Transcoding and Rate Adaptation Unit) frames, a TCP/IP transmission, or ATM cells, as are known in the art. Such message traffic segments 106 typically include a control portion, or header 108, having a message traffic type 109, and a data portion, or payload 110. The control portion 108 includes information such as data payload identity, switching node identity, timing criteria, Quality of Service (QOS), Virtual Path/Virtual Connection identifiers (VPI/VCI), and error correction, such as Forward Error Correction (FEC) information. The data portion 110 includes the data from the user 14$n$ which is to arrive at the destination. Both types of information may be reduced and aggregated. The classifier 54 identifies and dispatches the header 108 and data content portions 110 to the reducer 58, shown generally by 54.'

The efficient, optimized backhaul protocol 67 includes a packet 100 format also including a header 104 and a data content 102 portion. The reducer 58 gathers information from a plurality of header 108 portions and data content 110 portions, and aggregates data items in the aggregated header info 112 and aggregated data content 114 segments, shown generally as processing 58'. Information from a plurality of user 14$n$ packets 106 may be included in a single aggregated header 112 and data content 114 portion, respectively. Identification of redundant and/or recreatable information, such as data which is repeated or sparse, and reorganization and/or elimination of the identified data results in a reduction in the total data volume to transmit. The identified data 116 is data which may be redundant or recreatable and is extracted, or eliminated, from the resulting backhaul protocol packet 100 for transmission over the backhaul link 24.

The framer 64 organizes 64' the remaining data, which may be either unique, unrecreatable, or otherwise unmalleable, into the backhaul protocol packet 100 format. In this manner, an exemplary three user data packets 106 reduce to a single aggregate packet 100 using the backhaul protocol format 100. An indicator 105, described further below, denotes the regenerable data and the aggregation rules 62 for recreating the reduced and aggregated data 116.

Figure 6:
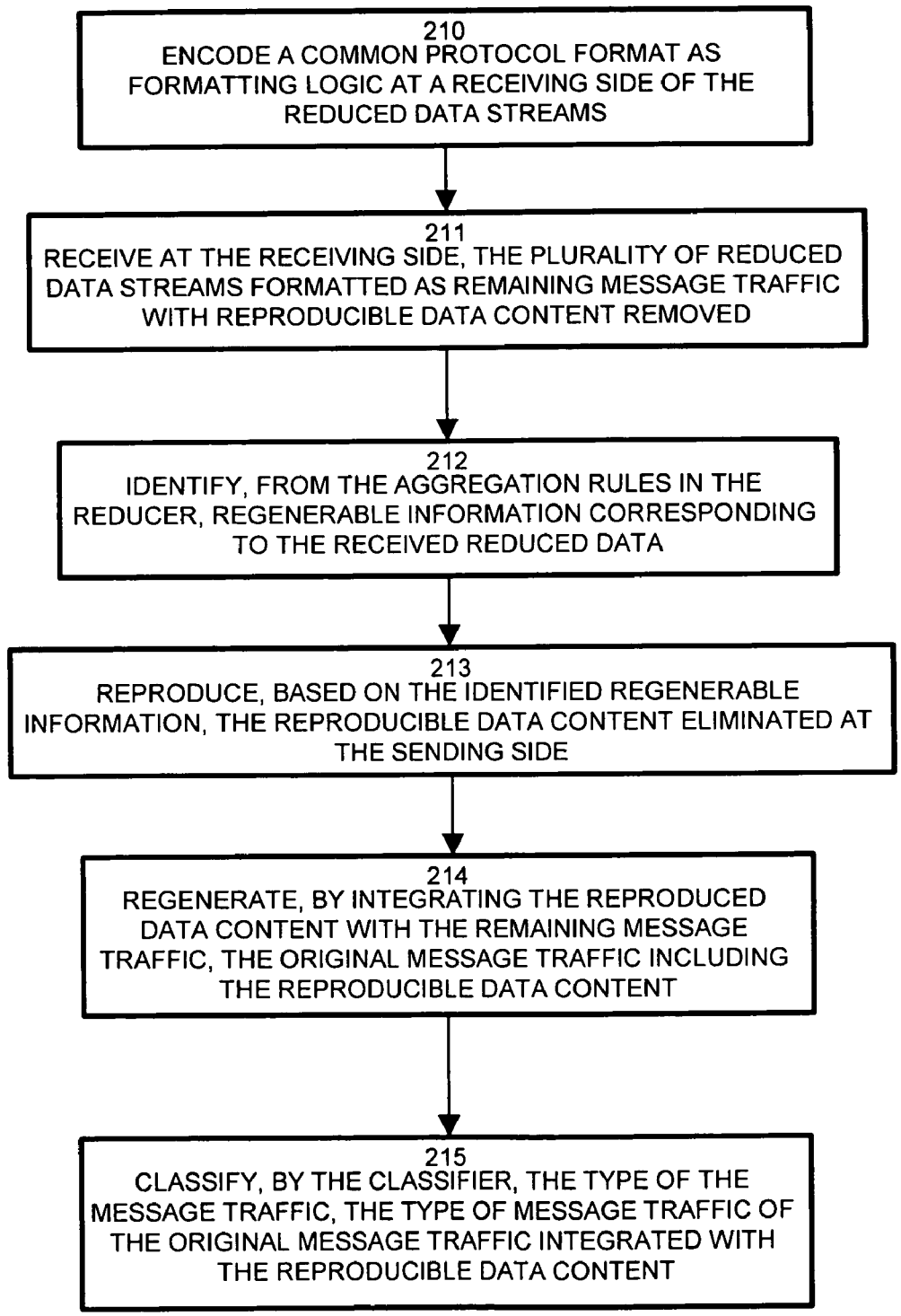
FIG. 6 shows a flowchart of receiving the aggregated and reduced data at the destination backhaul gateway device as in FIG. 4.

FIG. 6 shows a flowchart of receiving the aggregated and reduced data at the destination backhaul device as in FIG. 3. Referring to FIGS. 3, 4, 5 and 6, at step 210 the backhaul gateways 30, 40 initialize by encoding the common protocol format 67 as the formatting logic 66 at a receiving side of the reduced data streams. The common protocol format 67, as described above, allows the common protocol format 67 to transport the aggregated, reduced message traffic sent from the sending backhaul gateway 30. At step 211, the backhaul gateway 40 at the receiving side receives the plurality of reduced data streams formatted according to the common protocol format 67 to include the remaining message traffic with reproducible data content 116 removed. The remaining message traffic 44 is the output from the aggregation and reduction operations, described further below. The framer 64 in the backhaul gateway 40 unframes, according to the formatting logic 66, the reduced data according to the backhaul protocol format. The packetizing engine 38 is conversant with the backhaul protocol 67 and is operable to remove the framing information which the sending packetizing engine 34 applied.

At step 212, the bandwidth reduction engine 32, identifies, from the aggregation rules 62 in the reducer 60, regenerable information 116 corresponding to the received reduced message traffic 44. The regenerable information is that which the sending bandwidth reduction engine 32 eliminated from the message because it determined that it carried information already known, accessible or derivable from the previous message traffic. At step 213, the bandwidth reduction engine 32 reproduces, based on the identified regenerable information, the reproducible data content eliminated at the sending side gateway 30.

At step 214 the reducer generates, by integrating the reproduced data content with the remaining message traffic, the original message traffic including the reproducible data content. At step 215, the classifier classifies the type of the message traffic, the type of message traffic of the original message traffic integrated with the reproducible data content, and forwards the message traffic onto the remote endpoint. The forwarded message traffic corresponds to an original protocol of the original message traffic at the sending side in such a manner that the intervening backhaul protocol reproductions are undetectable to the recipient remote endpoint.

Figure 7:
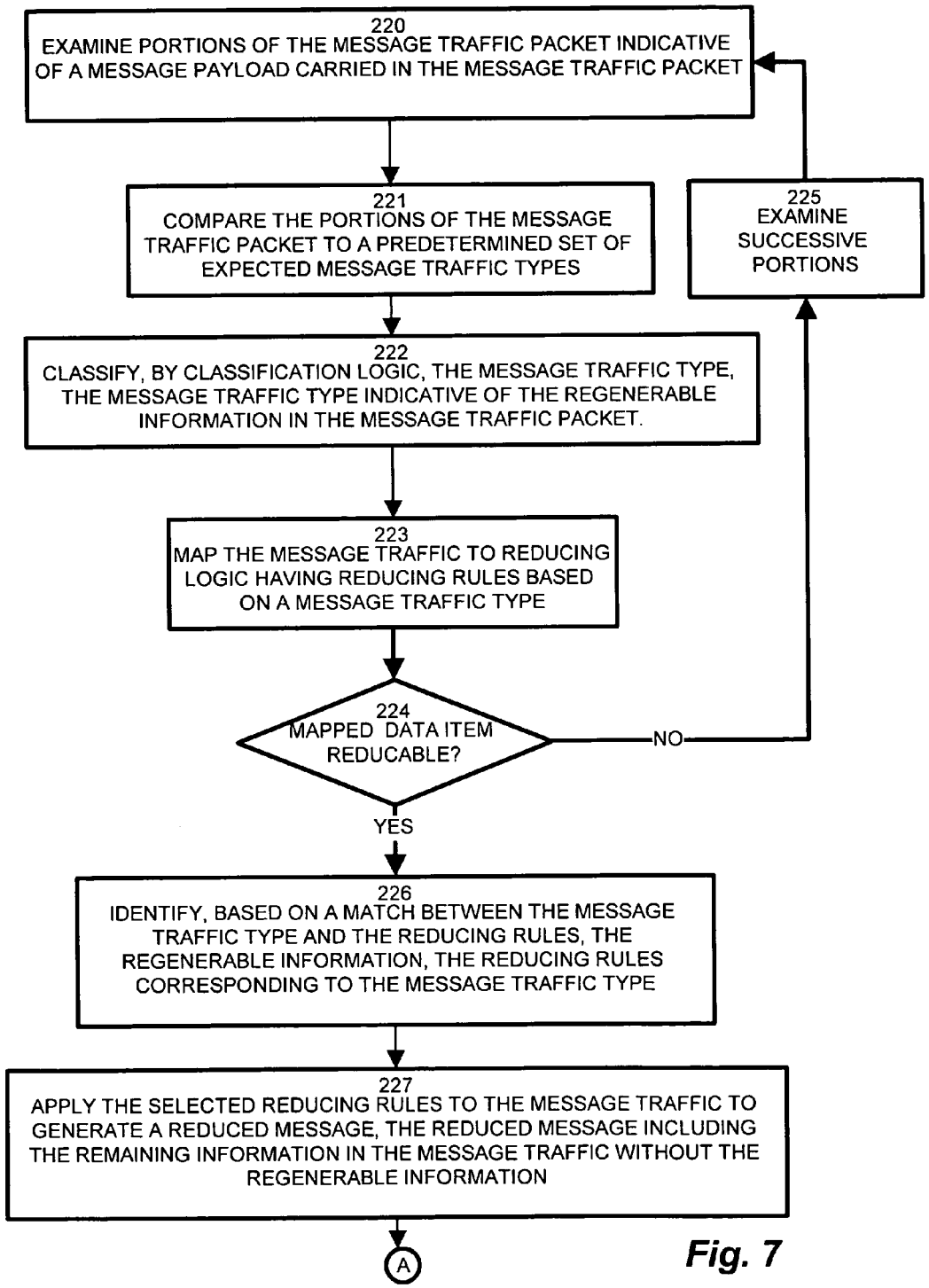
FIGS. 7 and 8 show a flowchart of the backhaul gateway device aggregating and reducing message traffic as in FIG. 2 in greater detail.
Figure 8:
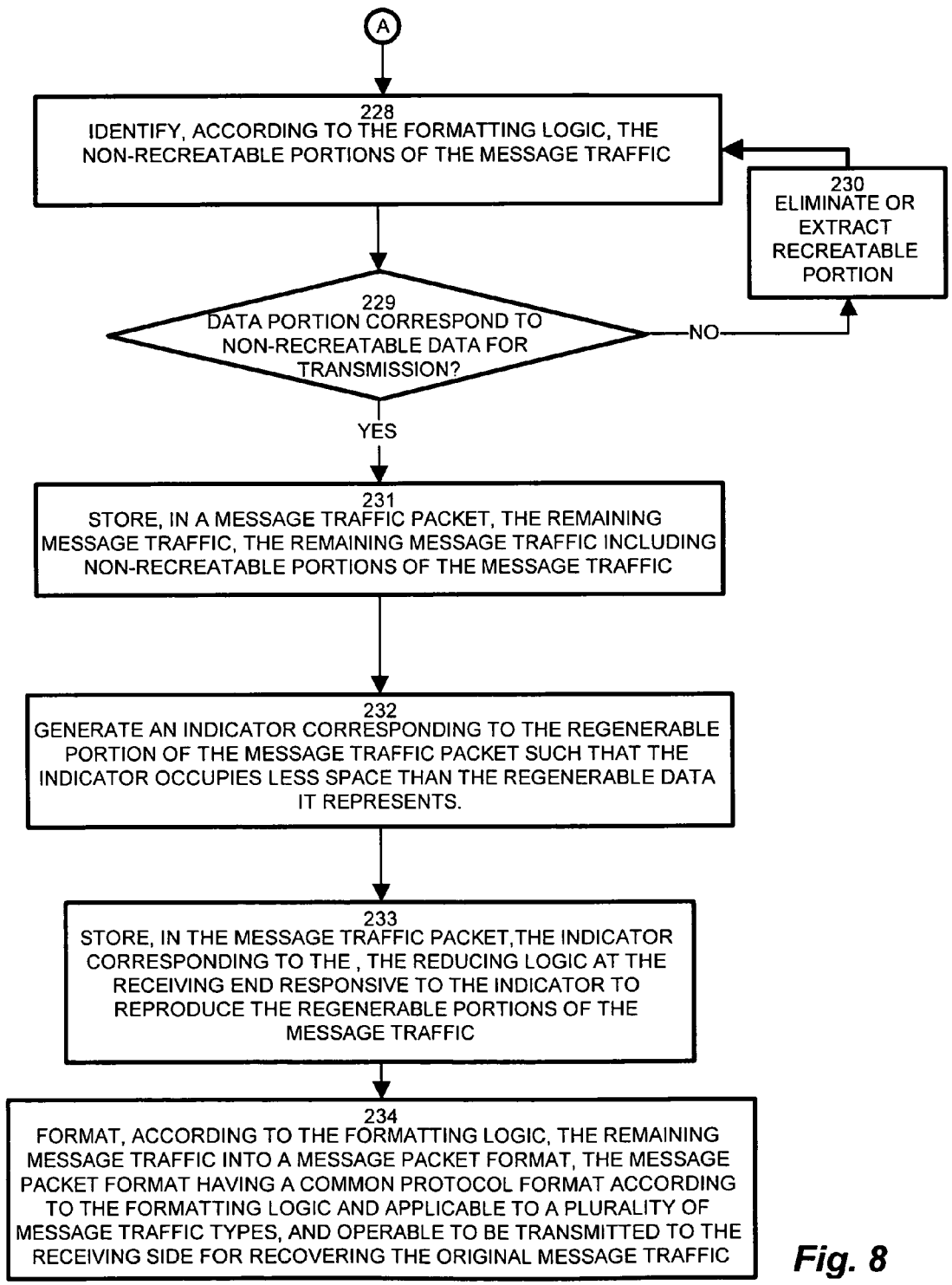

FIGS. 7-8 show a flowchart of the backhaul gateway device aggregating and reducing message traffic as in FIG. 2 in greater detail. Referring to FIGS. 4, 7 and 8, at step 220, the classifier 54 examines portions of the message traffic packet 106 indicative of a message payload 110 carried in the message traffic packet 106. As indicated above, the aggregation method depends on the classification (data type) of the data to be aggregated and reduced. In order to reduce the latency, the aggregation and reduction begins prior to receipt of an entire frame (packet), before receiving the entire packet, also described below with respect to particular classification of data for aggregation and reduction. At step 221, the classifier 54 compares the portions of the message traffic packet 106 to a predetermined set of expected message traffic types 109. Such comparison may be via a lookup in a list of expected message types, for example. At step 222, the classifier classifies, by classification logic 56 in the classifier 54, the message traffic type 109 to enable the reducer to check for regenerable information. Depending on the type of the message traffic 44, different reducing and aggregation rules 62 are applicable.

At step 223, the reducer 58 maps the message traffic 44 to reducing logic 60, the reducing logic 60 having aggregation rules 62 based on a message traffic type 109. At step 224, a check is performed to determine if a particular mapped data item is reducible. If there is no reducible data in the examined portion, control reverts to step 220 to examine successive packets 106 or portions thereof, as depicted at step 225.

If there are reducible portions in the message packet 106, then, at step 226 the reducing logic 60 identifies, based on a match between the message traffic type 109 and the reducing rules, the regenerable information, the aggregation rules 62 corresponding to the message traffic type. At step 227, the reducer 58 applies the selected aggregation rules 62 rules to the message traffic 44 to generate a reduced message 100, the reduced message 100 including the remaining information 102 in the message traffic 44 without the regenerable information 116.

Depending on the protocol or format of the incoming data to the backhaul gateway, certain portions contain regenerable data, in which the message traffic type 109 is indicative of the regenerable information 116 in the message traffic packet 106. The reducer 58, therefore, parses the message traffic 44 to find message traffic types 109 having regenerable information 116 by matching with message traffic types known to have regenerable information 116. For example, a stream of packets 106 carrying voice data typically has segments of silence. Since the silence does not need to be transmitted over the backhaul link 24, identification and elimination of the silence reduces and allows aggregation of the substantive voice portions.

The framer 64 frames the non-recreatable data for transmission according to the backhaul protocol 67. At step 228, the framer 64 identifies, according to the formatting logic 66, the non-recreatable portions of the message traffic 44. At step 229, a check is performed to determine if a particular portion corresponds to non-recreatable data for transmission. If a particular portion is not for transmission, that portion is eliminated 116 or extracted, as depicted at step 230, and control reverts to step 229 for successive data.

The remaining message traffic following the check at step 229 corresponds to non-recreatable data for transmission. If the message packet 106 or portion thereof is non-recreatable data, according to the check at step 229, than at step 230 the formatting logic stores, in a message traffic packet 100, the remaining message traffic, the remaining message traffic including non-recreatable portions of the message traffic. At step 231, the formatting logic 66 generates an indicator 105 corresponding to the regenerable portion 116 of the message traffic packet such that indicator 105 occupies less space than the regenerable data it represents. The backhaul protocol 67 defines the indicator 105 such that the receiving backhaul gateway 40 may interpret the indicator 105 in a manner to enable recreation of the data it represents. Transmission bandwidth is saved because the indicator occupies less space than the recreatable data it represents.

At step 232, the framer 64 stores, in the message traffic packet 100, an indicator 105 corresponding to the regenerable portion 116 of the message traffic packet 100, the reducing logic 60 at the receiving end responsive to the indicator 105 to reproduce the regenerable portions 116 of the message traffic 44. At step 233, the framer 64 formats, according to the formatting logic 66, the remaining message traffic into the message packet format, the message packet format having a common protocol format 67 (backhaul protocol) according to the formatting logic 66 and applicable to a plurality of message traffic types 109, and operable to be transmitted to the receiving side for recovering the original message traffic 106.

The common protocol format 67 carrying data over the backhaul link 24, or backhaul protocol, conforms to a range of expected message traffic types to enable reducing and aggregating of the arriving wireless message traffic. The aggregation rules 62 and formatting logic 66 apply to the range of expected message traffic types to provide a general backhaul protocol 67 applicable to the various message traffic types 109. Reduction and aggregation of exemplary message traffic types is discussed further in the copending U.S. parent patent application cited above.

FIG. 9 shows the aggregation rules 62 in the backhaul gateway device of FIG. 4 in greater detail. Referring to FIG. 9, the aggregation rules table 72 includes entries 71 corresponding to the message traffic 44. A message traffic type field 76 maps from the message traffic type 109 from the classifier 54. Each of the entries 71 includes parameters 74 indicative of operations for handling message traffic 50 of the particular type 76. Exemplary parameters 74 include an operation name 74A and an operation reference 74B for transferring control to the operation. Other parameters may be included in the table 72 in alternate configurations.

The aggregation operations referenced by the parameters 74 include the instructions for analyzing and determining recreatable data 116. For example, in a 2G speech scenario, an aggregation operation would determine which one of three types of speech data, either voice, silence, or idle, exists in a segment and then parses the data to eliminate the idle segments and a portion of the silence (background noise) segments.

Therefore, the type-specific state machines perform type-specific processing. Such type-specific processing occurs via an aggregation process in the bandwidth reduction engines 32 in response to the aggregation processor. In a typical implementation of this speech scenario process, for example, on a GSM TRAU frame that is carrying a 16 Kbps GSM voice channel, there are 20 ms frames that may be generally deemed to carry voice or silence information. The voice information typically fills most of the frame. The silence information occupies only a small fraction of the frame with the rest of the frame being redundant or "don't care."

If, on a particular channel, there is a series of voice frames followed by some silence frames, processing starts in the "voiced" state, sending all the bits for the voice frames and for the beginning of the first silence frame. But as the silence frame progresses, the aggregation processor 52 rapidly identifies it as silence and transitions into the "silence" state. In response to this change of state, the aggregation processor 52 forwards a state change indicator to the aggregation process.

Thereafter, as long as processing remains in the silence state, the aggregation processor 52 forwards zero bits to the aggregation process.

In terms of aggregation efficiency, a certain amount of overhead is required for each lump of aggregated data. Accordingly, bandwidth efficiency may be improved by sampling the state machines at widely spaced intervals, thus generating a minimum number of lumps of aggregated data. On the other hand, low latency is a critical competitive advantage, so it is beneficial to sample the state machines frequently, thus minimizing the delay from data arrival until an aggregated lump of data is forwarded.

However, the granularity of the decision process that watches each channel throughout the processing intervals allows an optimal trade-off between bandwidth saving and latency. More importantly, the backhaul gateway 30, 40 is able to set the fixed time interval for the aggregation process (bandwidth reduction engine 32) to as short as two milliseconds and still achieve nearly a 2 to 1 bandwidth saving on typical GSM traffic. For example, with a two millisecond aggregation interval (and a corresponding 2 ms latency at the other end) the total system latency can be below 5 ms while providing substantial bandwidth reduction, or savings.

The reducing logic 60 employs a variety of techniques and methods for identifying regenerable traffic and header content in the message traffic, as depicted in FIG. 5. Such techniques are discussed further in the parent patent application, entitled "METHODS AND APPARATUS FOR NETWORK SIGNAL AGGREGATION AND BANDWIDTH REDUCTION" referenced above.

Figure 10:
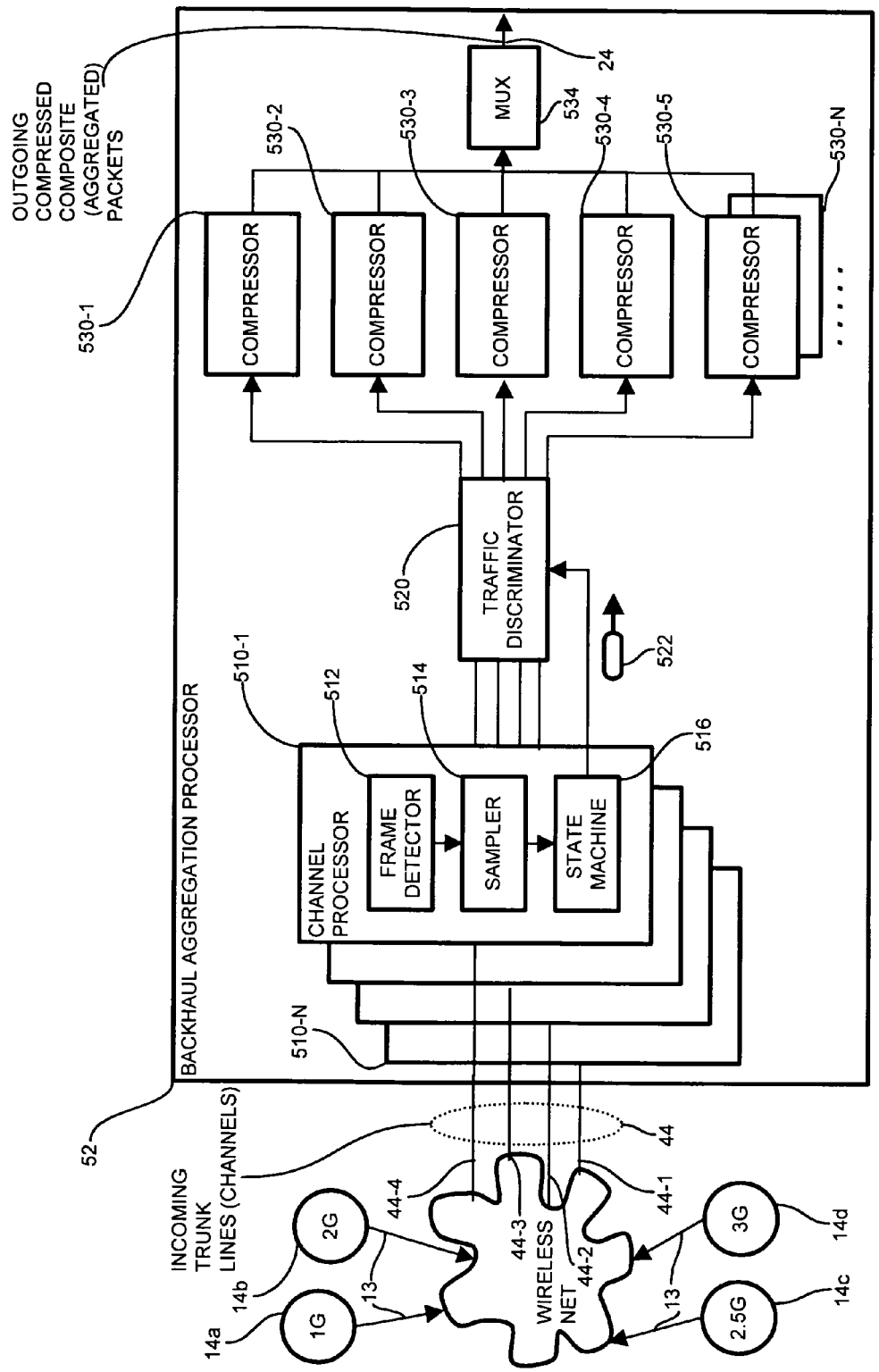
FIG. 10 shows the backhaul aggregation processor for framing and latency reduction via concurrent state machines operating on parallel channels over the backhaul link.

FIGS. 10-18 below and the accompanying discussion discuss methods and techniques for detecting, classifying, and framing the aggregated individual types of message traffic 48 as implemented by the reducing logic 60, performed by the packetizing engine 34 of FIG. 3 using the backhaul aggregation processor 52 of FIG. 4. FIG. 10 and the accompanying text discuss framing and latency reduction via concurrent state machines 516 operating on parallel channels over the backhaul link 24. Referring to FIGS. 3, 4 and 10, as indicated above, the backhaul aggregation processor 52 implements a set of concurrent state machines 516, shown in FIG. 10-1, each responsible for a particular channel 44-1 . . . 44-4 handling a particular traffic type. Each of the particular traffic types is aggregated, thus reducing bandwidth requirements, according to the reducing logic 60 appropriate to that traffic type. In the exemplary configuration, using 20 ms packets, aggregation may result in classifying reproducible data in 2 ms (2 bits), achieving an order of magnitude improvement. The backhaul aggregation processor 52 manages the channels 44 and corresponding state machines 516 over the backhaul link 24. Each of the channels 44, therefore, represents a portion of the available backhaul bandwidth usable for message traffic 48. Further, each channel 44 may be subdivided into subchannels including a subdivision of the total channel bandwidth, such that each subchannel has a state machine 516 for message traffic 48 on the subchannel, now discussed in further detail.

For example, a 64 Kbps DS0 bit stream that might be used either in its 64 Kbps form (channel) or as four separate 16 Kbps channels (2 bits of each byte per channel per 125 microsecond), thus the backhaul aggregation processor 52 runs five state machines 516. One state machine 516 is being fed the whole 64 Kbps bit stream and the other four are being fed the four separate sub-channels.

When the DS0 is in use as a 64 Kbps channel, only the state machine 516 that is seeing the whole 64 Kbps stream is activated (i.e. detects framing and transitions to various active states). The other state machines in the respective channel processors 510-N remain in the unlocked state (i.e. looking for framing identification). In contrast, when the DS0 is in use with one, two, three or four separate subchannels at 16 Kbps, the state machine 516 looking at the whole 64 Kbps remains in the unlocked state while 1-4 of the state machines 516 looking at the sub-rate channels will detect framing and transition to "locked" and then to other active states. Therefore, the state machines 516 transition from an idle or "unlocked" state to a locked or active state upon detecting framing corresponding to its stream characteristics (i.e. the speed and traffic type the state machine is designated to handle).

Therefore, separate state machines are configurable via the channel processors 510-N for each potential channel within the trunk. In the example above, on the first 64 Kbps DS0 within a T1 or E1 trunk the backhaul aggregation processor 52 will be running five separate state machines 516. This DS0 might contain a 64 Kbps channel or it might contain up to 4 separate 16 Kbps sub-rate channels. Since it may not be known in advance which case it is, or if it's carrying subrate channels, whether all four subrate channels are in use, the aggregation processor 52 runs one state machine 516 on the full 64 Kbps bit stream and four others which get the four different 16 Kbps bit streams that would be the subrate channels if the DS0 is being used that way.

Therefore, state machines 516 are configured against potential subchannel arrangements, since unlocked state machines 516 consume minimal processing resources and thereby become readily adaptable and available for channel 44 usage. Ideally, the backhaul aggregation processor 52 continues to run state machines 516 against potential channels 44, even if they are not currently in use. Such state machines 516 will not synchronize (because there is no framing and no useful data present), however if traffic changes occur and the trunk's configuration changes so a previously unused potential channel suddenly starts being used, a previously idle (unlocked) state machine 516 will now catch this case by synchronizing on the first frame that comes through.

Referring to FIGS. 1, 3, 4 and 10, the backhaul aggregation processor 52 receives incoming multiple trunk lines 44 from a network such as a wireless communications network 45, collectively representing service provided by wireless antenna sites 46 for various types of traffic, including 1G, 2G, 2.5G and 3G (14a-14d, respectively). The channels 44 carry wireless message traffic of various types emanating from the plurality of wireless devices 12 on the wireless network 500. Each of the channels 44 corresponds to a channel processor 510-1 . . . 510-N (510 generally) having a frame detector 512, a sampler 514 and a state machine 516. As indicated above, multiple channel processors 510 may "watch" a particular incoming channel 44 looking for framing information (i.e. the start of a frame corresponding to the state machine 516 in the channel processor 510). A traffic discriminator 520 receives an indication 522 of the types of compression, or aggregation, appropriate for each channel 44. The traffic discriminator 520 also receives the traffic streams (channels) 44 and selects particular compressors 530-1 . . . 530-N (530 generally) for each of the channels 44. The traffic discriminator 520, upon receiving the indication 522 identifying the traffic in each stream 44, selects a particular compressor 530 operable to implement reducing logic 60 appropriate to that traffic type. A multiplexor 534 receives the aggregated (compressed) packets and multiplexes them as the aggregated message traffic signal 48 over the backhaul link 24 to the remote backhaul gateway 40.

In operation, the backhaul aggregation processor 52 receives a variety of wireless traffic 13 corresponding to various deployed technologies 14*a* ... 14*d* from variety of wireless devices 12. The frame detector 512 detects frames, or packet boundaries, in the incoming stream. Since each of the channel processors 510 corresponds to a particular traffic type and speed (bandwidth), the parallel frame detectors 512 watch the respective channels 44 to identify a frame corresponding to the rate (speed) and traffic type which the channel processor is configured to process. The sampler 514 invokes the aggregation rules 62 and analyzes a minimal number of bits to identify the type of reducing logic 60 appropriate to the type of received traffic 13. The state machine 516 operates on the received bits to attain a deterministic state indicative of the appropriate aggregation (reducing logic 60) to be performed on the channel 44, and the traffic discriminator 520 receives the corresponding indication 522.

Such aggregation and compression is achievable via the low latency techniques discussed further below, and is particularly beneficial in wireless networks. In such a wireless network 45, the Wireless Service Provider (WSP) typically has a recurring cost for leased E1 or T1 trunks that "backhaul" voice and data traffic from geographically dispersed cell sites (the Radio Access network or RAN) to high-bandwidth core network facilities. At a monthly cost of between $500 and $1000 per E1 or T1 trunk, RAN access lines can make up the majority of a WSP's monthly network operating expense. And, as operators add new radio capacity to keep up with subscriber growth, this cost increases.

At the same time, wireless operators are anxious to add third generation (3G) mobile services. Unfortunately, each generation of radio equipment uses a different format for the traffic between cell sites and central facilities. Typically, WSPs are forced to acquire additional, independent trunks to each radio site to backhaul traffic from new 3G radios to their core network facilities, possibly doubling the recurring cost of RAN access lines, despite low initial traffic volumes for these new services.

Wireless Service Providers are seeking a way to reduce the number of trunks and/or the amount of bandwidth needed between their cell sites and their core network facilities without degrading their service. There are products available today, which multiplex traffic from multiple T1 or E1 trunks so as to recapture unused portions of the bandwidth of the RAN access trunks and combine used portions onto fewer trunks. Such conventional approaches have been suggested from commercial vendors including Eastern Research, Carrier Access, Lucent Technologies, Paragon Networks, Rad Communications and Valiant Communications among others. However, such conventional approaches are generally far less efficient because they merely eliminate unused channels but do no further compression. There have also been product announcements for products that will compress GSM A.bis traffic. However, such conventional approaches typically introduce 20-25 ms of additional latency because an entire 20 ms packet (20 bits) is sampled prior to performing a compression or aggregation decision or action. When added to normal 2G and/or 3G speech latencies, 20-25 ms of added delay on each leg of a mobile-to-mobile call (i.e. 40-50 ms total each way, or 80-100 ms additional round trip delay) significantly degrades the quality of service the WSP can provide.

Configurations discussed herein substantially overcome such shortcomings by compressing the data sent between the cell site and the core network, while introducing less than 5 ms added delay. Such compression approach is particularly beneficial with widely deployed 2G wireless technologies including, most notably, GSM. The compressed traffic is then statistically multiplexing with uncompressed traffic from other generations of equipment, in a fashion that avoids lost speech. The resulting traffic is sent over a minimal number of E1/T1 trunks or other forms of digital links (for example, fiber, coax or copper loops using TDM, ATM, Ethernet or similar link protocols). As a result, this approach reduces the total bandwidth required for RAN backhaul to a far greater extent than was previously possible and is performed without noticeable degradation in service.

Conventional configurations of wireless trunk processing depict a problem in that the existing approach uses separate T1/E1 links for each generation of radio equipment: 1G—TAC 900 equipment (could be AMPs or other 1G); 2G—GSM A.bis (could be TDMA, CDMAone, PDC or other 2G technology); and 3G—UMTS Iub (could be CMDA2000 or TD-SCDMA). In contrast, configurations herein combine traffic onto a single logical RAN backhaul path 24. As explained later, this single logical path may involve multiple trunks, however conventional shortcoming are overcome such that configurations herein reduce the total number of backhaul trunks required.

There is a long history of telephone circuit multiplexing to save bandwidth. The technology dates at least back to the 1950s when it was used on the early submarine voice cables. Specific prior art references include the TASI systems (originally from the Bell System, but see the references in Nortel U.S. Pat. No. 4,627,049). More recently, digital circuit multiplication equipment (DCME) has been standardized by Study Group 15 of the ITU-T as ITU recommendations G.763, G.764, G.765, G.766 and G.767. In particular, Appendix I to ITU recommendation G.764 includes a rich set of references to the state of the art as of 1995.

Also, other conventional approaches include:

U.S. Pat. No. 6,320,876 describes a typical DCME system that handles 64 Kbps voice (which it compresses with ADPCM & DSI much as we compress 1G traffic) together with E1 specific signaling and in-band modem data. It does not do anything specific to wireless formats; it does not do anything with speech that's already coded; and it does not have to deal with latency problems (because it only uses ADPCM, a low latency coder).

U.S. Pat. No. 5,459,722 shows one way to introduce ATM cells into proprietary DCME streams, but it's limited to AAL1 voice band packets and G.764/T.312 DCME equipment.

Other conventional approaches include adding facilities within 3G radio equipment (where RAN output is ATM-based), so it will be able to accept uncompressed 2G traffic, convert that traffic to ATM cells and do ATM multiplexing. Such an approach may have an advantage of some multiplexing, but also the disadvantage of the so-called ATM "cell tax." Therefore, while such an approach may recover some stranded bandwidth, it uses more bandwidth for the actual voice and data traffic that is backhauled, and further, does nothing to compress the 1G and 2G data.

Configurations herein include the backhaul aggregation processor 52 which includes channel processors 510 that look at the uncompressed TDM channels 44 on the incoming T1/E1 links with multiple framing circuits so as to identify any of the potential channels 44 that might arrive. Frame detection logic in the frame detector 512 is very low cost, whether implemented at processor code or in gates within an ASIC or PLD. By providing frame detection logic for all possible signals that might appear on the aggregate T1/E1 trunk, in any TDM timeslot, and in any sub-rate channel within any TDM timeslot, we are able to automatically identify channel usage. As a result, the backhaul gateway 30, 40 does not require manual provisioning and our equipment can function even with radio access network equipment that is subject to manual or automatic reconfiguration during operation.

Once signaling channels are determined, those channels 44 may be monitored for administrative signals that give further indications of how timeslots and sub-channels are configured or reconfigured, further helping our system to identify current timeslot and sub-rate channel assignments and track any dynamic reconfiguration that may occur.

With the different kinds of channels 44 identified, channel-specific compression is applied to those channels where it will have the most benefit, based on the reducing logic 62. In the initial implementation, the backhaul aggregation processor 52 provides compression for GSM A.bis TRAU channels because these channels 44 have a fixed bandwidth allocation of 16 Kbps but carry a highly variable bit rate (varying between 0 and 16 kbps) with a potential to save more than half of the allocated bandwidth on average. Additional types of channels on radio access networks which can be compressed include at least the following:

GSM per-TRX signaling channels (at either 16 Kbps or 64 Kbps depending upon equipment manufacturer), which can be compressed by eliminating idle time between messages and by compressing the actual messages.

GSM per-A.bis-interface signaling channels at 64 kbps, which can be compressed by eliminating idle time between messages and by compressing the actual messages.

1G bearer channels (e.g. AMPS or TAC 900) where the 64 Kbps bearer channels carry G.711 voice, which can be compressed with normal voice compression algorithms, including voice activity detection in order to minimize bit rate during silences.

For GSM links, the largest compression gain comes from statistically multiplexing traffic that is carried in A.bis TRAU channels—traffic that is mostly voice but may include some circuit-switched data. Typically, when stat muxing many channels onto fewer channels worth of bandwidth, there is the potential for either very long latencies or lost data, if all channels should become active at the same instant. However, there are three kinds of traffic on the A.bis access links, i.e. voice, signaling and user data, and the backhaul aggregation processor 52 is operable to distinguish between them as discussed further below. By establishing two (or more) priority queues for outgoing data on the compressed link(s) and giving high priority to voice data, the aggregation processor 52 may achieve a very high average compression of voice data, without any loss or any substantial delay (of the voice data), as long as the statistical mix includes signaling and user data and we are willing to tolerate occasionally longer delays of that signaling and data traffic.

Since a.bis frame are 20 ms long, if the sampler 514 *e* waited to look at a complete frame, it would introduce 20 ms of delay in just the first step. In order to avoid introducing more than an absolute minimum of additional delay into the voice signals, the backhaul aggregation processor 52 samples the digital bit streams of the TRAU channels 44 frequently and maintains separate state machines 516 for each channel. The word "frequently" needs to be defined. Looking at less than 125 uses doesn't make sense for data being received in T1/E1 format—the T1/E1 frame is 125 usec long, and provides two bits per 16 Kbps A.bis channel per 125 usec. For processing efficiency and in order to minimize the overhead that is introduced, the aggregation processor 52 accumulates TRAU frames for several of these minimum intervals to produce the actual sampling interval which is nominally one or two milliseconds. The trade off is thus between efficiency and latency. In an exemplary implementation, a one millisecond sampling interval is employed.

The backhaul aggregation processor 52 provide a separate compressor 530 for each A.bis TRAU channel 44 in the via a state machine 516 that is updated every one millisecond with the 16 bits that have arrived during the preceding millisecond. Depending upon the current state, the output may forward some or all or none of the input bits, or a code based upon the input bits. The output bits are forwarded to a packetization stage. Compression occurs because, when channels are inactive, no data need be sent and when channels carry voice, silence may be compressed to short (and infrequent) SID frames.

A similar state machine strategy may be applied to A.bis signaling channels, and to 1G bearer channels after they have been converted to compressed digital bit streams using established voice compression and voice activity detection algorithms. Each millisecond, the outputs of the compression state machines 516 that have current outputs (i.e. are active), are combined into one or more composite packets that, together, represent less total bits than the original data (due to the compression), as shown in FIG. 5. At a minimum, two different composite packets are assembled each millisecond—one for bits from channels that currently carry voice and one for bits from all other channels, whether compressed or not. As discussed above, voice packets get priority when it comes time to transmit data on the compressed data link(s).

If the compressed data link were error free, it would be sufficient to pass the compressed data bits to a set of comparable, but inverse, state machines 516 in a receiver that would then be able to recreate the original input. However, the compressed data link may not be error free, so there is a risk that the state machines 516 at either end will get out of sync. Accordingly, a short header is provided on each packet. This header 104 includes sequence information and highly abbreviated address or state information indicating which channels are currently active. This header 104 (FIG. 5) is protected with forward error correction (FEC) to minimize the likelihood of corruption.

In choosing the FEC scheme, there is a trade off between minimizing overhead and minimizing the impact of errors. The exemplary approach herein is to provide, at all times, adequate forward error correction to insure the system performs well on links with typical error rates—that is error rates of 1 in 10**6 in the exemplary implementation. Then actual error rates are monitored at each receiver. If the link error rate increases beyond a predetermined design criteria, the system generates an alarm and it automatically applies additional FEC in order to continue functioning. The additional FEC will add overhead thus reducing the amount of compression that is achieved. In the worst case, reduced compression may result in reduced channel capacity in the system, however the system will continue to function despite errors and system degradation will be gradual as link errors increase.

The foregoing describes compression for 1 G and 2G radio access links. We also support the ability to include traffic from 3G radio access links. In general, 3G link protocols have already been designed with compression for silences, and they use ATM to achieve a level of statistical multiplexing. The backhaul aggregation processor 52 need not attempt to provide major additional compression, however does provide two different ways to combine this 3G traffic with our compressed 1G and 2G traffic so the wireless operator gains the benefit of statistical multiplexing and is able to implement 3G radio networks (that may be lightly loaded at first) without deploying additional radio access trunks. The approach includes two solutions. One is based on encoding the 3G traffic and combining it as another (uncompressed) channel in the composite packets that are sent over our compressed link. At a minimum, The backhaul aggregation processor 52 filters out idle cells and other cells that are not carrying 3G traffic, so we achieve some compression above and beyond the statistical multiplexing gain. This is the most bandwidth efficient approach and the preferred implementation.

However, some operators have standardized on ATM transport throughout their access network. In this case, we allow an ATM switching function to do the statistical multiplexing of our compressed 1G and 2G traffic with the 3G traffic. This requires that the compressed 1G and 2G traffic be encapsulated in ATM cells. The use of ATM encapsulation reduces the total compression that is achieved, however by defining particular ATM adaptation with a nominal ATM "AAL0" cell format, the compression minimizes the amount of added ATM "cell tax", i.e. ATM overhead. Whether using ATM or the optimized packet formats, typically the lowest layer protocol supports link sharing, i.e. the distribution of one logical stream of compressed traffic over two or more physical trunks.

While the compressed packet format described above and in the attached documents is based on variable length packets, it is possible to encapsulate this data in fixed length packets or cells, as described for ATM case two paragraphs above. Note that it is also possible to use this kind of scheme with the T1 or E1 physical frame format, which can be regarded as regular fixed sized packets or cells (of 192 bits in the case of a T1 trunk and of 240 or 248 bits in the case of an E1 trunk). By using this kind of an approach, one can save the frame delimiters for the variable sized packets and avoid the need to perform bit stuffing on the data (to avoid frame delimiters appearing in the data). However, the aggregation processor 52 then adds at least a continuation field to indicate how data overflows from one fixed size frame to another. The exemplary implementation uses variable sized data packets, but either approach is viable.

Finally, it should be noted that the long term trend is to migrate all communications to IP networks or to IP networks running over Ethernet links. Just as the exemplary compressed data can be encapsulated in ATM cells, it can also be transported in IP packets or in Ethernet frames.

Particular configurations reduce the overhead associated with channel identification (i.e. identifying the types of traffic on the channel 44) over the backhaul link 24. Such configurations reduce the channel identification overhead, which typically occurs when transmitting the combination of several TRAU channel payloads between two gateways. FIG. 11 shows a typical arrangement of a message structure 550 transferred between the backhaul gateways 30, 40. Each active speech channel 44 adds its fraction to the message "TRAU Ch. N Payload" 550, where "TRAU Ch. N Payload" is a fixed size field with N representing a channel number (internally assigned between the gateways).

The size of the "TRAU Ch. N Payload" depends on the number of TRAU sampling periods (Ns) and can be calculated as (2 bits*Ns). Depending on the information received on an A-bis active TRAU channel N during the sampling period the ingress Access Gateway 30 may decide not to send these data to the egress Access Gateway 40. As a result, the "TRAU Ch. N Payload" may not be a part of the message sent between the Access Gateways resulting in the bandwidth savings of the "TRAU Ch. N Payload" field size.

Both ingress and egress Access Gateways 40, 30 respectively, require control information passed between them to express which TRAU channels on the A-bis interface are currently active, how to associate the "TRAU Ch. X Payload" fields received by the egress Access Gateway with the TRAU channels on the A-bis interfaces, how to prevent and recover from different error conditions. Such control information achieves the following:

1. Passes between the ingress and egress Access Gateways only the user and control data that belongs to active TRAU channels.

2. Minimizes the amount of control data overhead needed to synchronize both gateways and keep the system operational.

3. Both Access Gateways are informed when an A-bis TRAU channel state changes between active and inactive.

4. Provides for the receiving gateway to interpret the "TRAU Ch. X Payload" fields and map the data from each field to the appropriate TRAU channel on the A-bis interface.

There are several ways to specify which TRAU channel has its payload in the multiplexed payload packet. One mechanism employs a bit flag, or mask, indicative of which channels contribute payload. Such an approach, however, is ripe for improvement when a transmission includes many null flags indicative of inactive channels and hence, unused payload. Approaches herein provide a mechanism for marking such unused payload so that it need not burden the backhaul link, discussed further below with respect to FIGS. 15-18. The control information indicative of transmitting channels can be passed between the gateways using commands send in addition to the TRAU payload data. Control information protection may be employed, in particular configurations. It is not necessary to protect the payload fields since the TRAU transcoders should take care of the user data validation and error recovery. Error correction techniques may be introduced to recover the data corruption, which may happen during the message transmission.

In particular, one of the main sources of the bandwidth savings is the spare and redundant information inside of TRAU frames, which can be dropped on the ingress side (backhaul gateway 30) and recreated on the egress side of our system (backhaul gateway 40). The backhaul aggregation processor 52 employs the reducing logic 60 to analyze the contents of different TRAU frame types and define redundant and spare bits inside the frames as potential candidates to be discarded and rebuilt later on the receiving gateway 40.

The approach presented in configurations herein allows avoiding attaching any control information to the message between the gateways to indicate the contents of the TRAU payload fields. To be more specific, we can avoid the need for the "TRAU Channel Identification Bit Mask" field, which usually defines which TRAU channel inserted its "TRAU Ch. X Payload" field in the message. If we think of the information content passed in the "TRAU Channel Identification Bit Mask" field it becomes apparent that this information is redundant and shouldn't be passed to the second gateway. The reason is that both gateways (ingress and egress) by executing the same algorithm on the same sequence of data can come to the same conclusions about whether the next TRAU channel payload is redundant or not. As a result the ingress gateway won't send that next redundant TRAU channel payload and the egress gateway won't expect that payload in the next message.

Inside of the messages the "TRAU Ch. N Payload" fields should always be ordered in ascending order based on their TRAU Channel numbers. First, seventeen TRAU frame synchronization bits (seventeen 0s followed by 1), TRAU C-bits and Time-Alignment T-bits are sent between the gateways. This assumption is taken to avoid complexity in presenting the compression approach. Moreover it would be desirable to optimize (reduce) the amount of the TRAU information, which we pass between the gateways.

FIG. 12 shows an exemplary transmission 560 between backhaul gateways 30, 40. Referring to FIGS. 1 and 12, consider an example having three active uplink TRAU channels (Channel 5, Channel 12 and Channel 245), having payloads 562, 564 and 566, respectively. For example, assume a state when all these channels have valuable payloads which get included in the message on the ingress side and sent to the egress side as shown in FIG. 12.

At some point the ingress gateway receives an Idle Speech TRAU frame 570 on TRAU Channel 12 (564). The Idle Frame 570 has the structure shown on FIG. 13. The conclusion concerning the frame being an Idle Speech TRAU Frame type is made when the gateway analyses the contents of the C-bits inside of the frame. Based on the assumption that the ingress gateway always sends first 17 synch bits 572 and C- and T-bits, it will send octets 0-3 574 to the second gateway and then it will stop including "TRAU Ch. 12 Payload" fields in the messages for several subsequent messages 575 until the C-bits 16-21 and T-bits 1-4 576 (octets 38 and 39, 578) have to be sent. If the sampling interval is 1 ms (=16 bits of data on a 16 kbps link) and the TRAU frame is aligned with the sample interval (simple case), the number of messages, which will not have the "TRAU Ch. 12 Payload" field included, equals 17 (octets 4-37 with 2 octets are sent in one payload in 1 ms sampling interval) 575. The second gateway 40 after receiving the first two messages carrying octets 0-3 and analyzing the C-bits will determine that the current TRAU frame is Idle Speech TRAU frame so that the subsequent 17 messages received from the ingress gateway won't have the "TRAU Ch. 12 Payload" field included. FIG. 14 shows the message 580 structure for these 17 messages having only channel 5 payload 582 and channel 245 payload 584. The 18th message again resumes the initial structure 560 as shown on FIG. 12.

The preceding example depicts a specific case of how both gateways 30, 40 can exchange the compressed (by skipping the redundant and spare bits) TRAU frame data without requiring extra control information included inside the message to navigate the receiving side to the content of the payload fields. The reducing logic 60 has the aggregation rules 62 for identifying which C-bits, T-bits or any other bits can be dropped and later reconstructed. As both gateways execute the same decision algorithm, the statement that no extra control is needed stays valid.

The exemplary scenario above assumes the ideal, error-free case. The mechanism above therefore operates effectively since both gateways are synchronized. In actual implementations, different failures may occur in a system affecting the data compression process. Several techniques may be applied in data compression to detect, and recover from, errors.

Again referring to FIG. 10, the multiplexor 534 multiplexes the data emanating from the various compressors 530 for transmission via the backhaul link 24. In particular configurations, such multiplexing encodes the frames indicative of the channels 44 being transported, the channel address, and the payload to enable multiplexing and demultiplexing upon receipt at the remote backhaul aggregation processor 52.

For the receiver to de-multiplex TRAU payload, it needs to identify the source channel that contributed the payload in the multiplexed frame, and the contributed data chunk size denoted with the letter P. P is determined from the sampling rate of the original A.bis E1 links at the sender side. To adhere with the performance of a processor based multiplexing solution, this example will use a processing time of 1 millisecond for sampling E1 links, which amounts to P being 2 bytes. P cannot vary between TRAU channels because of the fixed sampling rate for E1 links. This makes it easier for the receiver to distinguish chunks of different source TRAU channels by simply working with fixed size of two bytes in the multiplexed frame.

Figure 15:
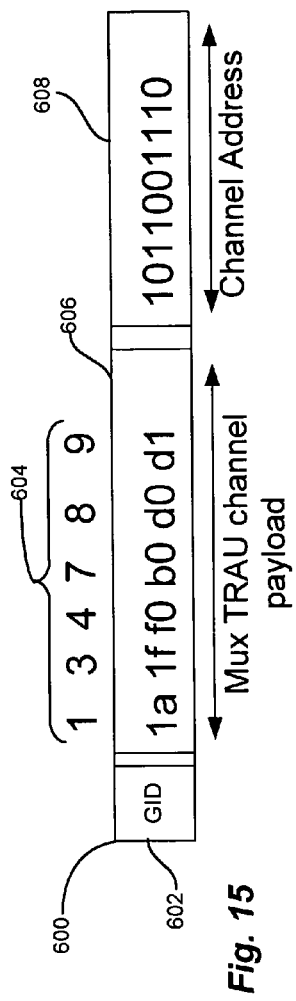
FIG. 15 shows an exemplary compression of multiple channels in a payload framed in the backhaul aggregation processor of FIG. 10.

In addition to the length of the contributed payload, the receiver also needs to identify the TRAU channels that contributed payload in the multiplexed frame. A simple approach for addressing the multiplexed payload is to assign one bit of address to each of the two bytes of the N TRAU channels processed by the processor core and transmit both the payload and the address information in a single layer 3 frame to the receiver. FIG. 15 shows an example of a multiplexed frame 600 with this approach. A group ID (GID) field identifies the source processor core that produced the N TRAU channels frame. For the example shown in FIG. 15, N is set to 10 and P is set to 1 byte. Notice that only TRAU channels 1, 3, 4, 7, 8 and 9 (bracket 604) have their payload 606 present in the frame 600. The channel address field 608 identifies these six TRAU channels with a bit value of one in a bitmask arrangement. Channels whose payload is absent are identified with a bit of zero.

With the approach shown in FIG. 15, the resulting overhead from the channel address will be one bit for every two bytes of TRAU payload or 1/16 bits, which amounts to 6.25%. It would be beneficial for this overhead to be reduced or eliminated in order to avoid expansion of compressed payload in those cases when there are no statistical gains from multiplexing TRAU data.

In order to reduce the layer 3 addressing overhead, the addressing information has to change less often so that it needs not be transmitted as often as the processing rate of TRAU payload 606. By examining TRAU channel content for voice, for the most part, the contribution in the multiplexed frame stays the same (is always present) except when an idle voice frame is being processed. When the TRAU idle frame payload is discarded, the corresponding layer 3 address bit 608 for the TRAU channel will flip from 1 to 0. The resulting bit will flip again to 1 when there is payload to contribute. For a given voice channel, there are many millisecond idle frames before an active frame is available hence, there should not be a need to flip the address bit every millisecond. However, an initial analysis of voice idle frame reveals that not all the idle frame content can be discarded. The first 17 bits of a TRAU frame 600 are sync bits that instruct the receiver to align with a new TRAU frame. The sync bits are followed by two bytes of control information (C bits) that contain important frame type information. The last two bytes of the frame 600 also contain control information but only one of those bits the DTX indicator is useful. Thus, during an idle frame, there can be two bit flips every millisecond in the corresponding layer 3 TRAU channel address— from 1 to 0 in the middle after the first four bytes (sync bits and frame type) are transmitted and the payload is discarded, and from 0 to 1 when the last two bytes are transmitted. In addition to idle frames, there are periods within idle sessions when a SID frame is transmitted. SID frames are carried just as active speech frames and therefore will trigger a bit flip in the corresponding address bit because they appear at a regular interval (once in 24 frames for GSM EFR voice coder) during an idle frame session.

Further analysis on idle frames reveal that the last two bytes should not be carried every millisecond because the DTX bit is assumed to only change once in several minutes. The first four bytes can also be avoided for transmission if more TRAU data is sampled and buffered before they are processed. When the receiver notices an end of an active frame and no content thereafter, it can safely assume that it should generate an idle frame for the next 20 milliseconds. The receiver may not be able to distinguish between an idle frame and a disconnection of channel. When a call is disconnected, the sender should transmit a TRAU frame with a known pattern such as 010101 to distinguish between idle and disconnected channel.

The initial buffering of TRAU data will incur additional latency of one (or worst case two) sampling period at the sender end. However the benefits in bandwidth savings outweigh the latency increase because avoiding transmission of the first four bytes of idle frame not only reduce TRAU idle frame overhead but also reduces the entropy in the layer 3 addressing. Hence, in this example, the overhead resulting from TRAU idle frame will be 0%.

The above scheme for reducing TRAU idle frames overhead contributes to the reduction of entropy in layer 3 addressing however, configurations herein disclose additional latency reduction. When a group of N TRAU channels are multiplexed together, the probability that the entire address group for N channels is similar with the previously transmitted address is given by the following equation:

$$Pn = N \times P1$$

Where N is the size of TRAU group and P1 is the probability that one of the TRAU channel address bit is similar to the corresponding bit in the previously transmitted frame. The conclusion to draw from the above equation is that the smaller the N the lower the probability of a change in layer 3 address from the previously transmitted address.

A small N may be desired for layer 3 addressing however, a small group size per processor core inefficiently utilizes processor capacity. Instead of having a small TRAU group, a slightly different approach is to divide the layer 3 address in groups of few fixed bits (sub groups within TRAU channel address group) and only transmit those address groups that have changed from the corresponding groups in the previously transmitted address, discussed further below.

Referring again to FIG. 15, identifying numbers 604 on top of the payload field identify those TRAU channels whose payload is present in the frame. In FIG. 15, N is set to 10 and channels 1, 3, 4, 7, 8, and 9 have contributed payload in the frame. Channels 2, 5, 6, and 10 have not contributed their payload because either they are idle or disconnected. If the channel address is divided into groups of fixed sizes and we only transmit groups when they are different from their corresponding pairs in the previous frame, we can affectively reduce the transmission of channel address and reduce the overhead associated with it.

Figure 16:
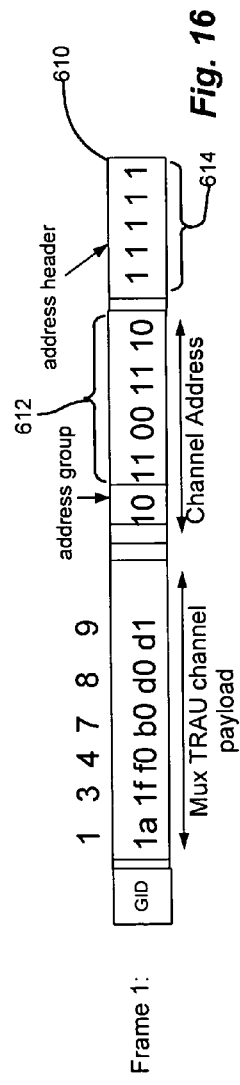
FIGS. 16-18 show a sequence of consecutive transmissions for eliminating recreatable information using the compression of FIG. 15.
Figure 17:
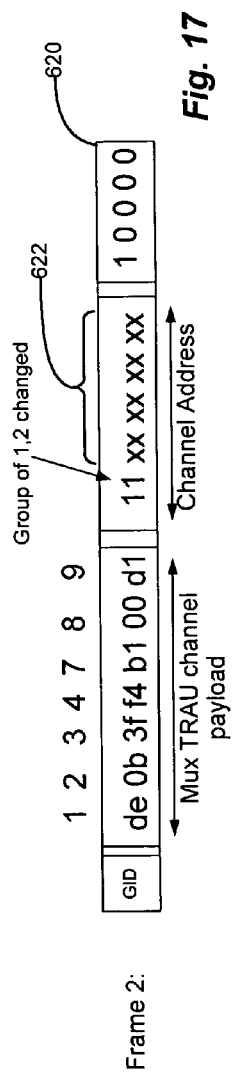
Figure 18:
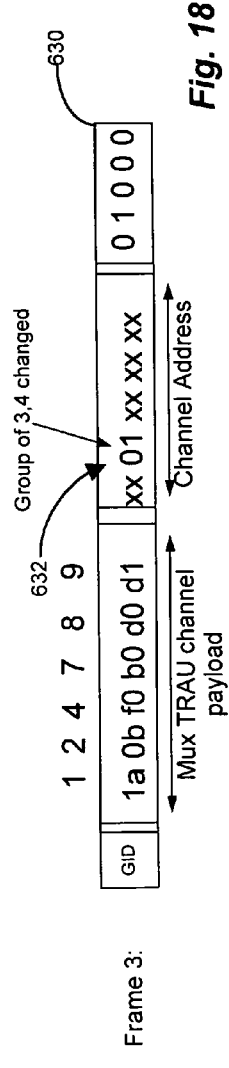

FIGS. 16-18 illustrate this concept using the original frame shown in FIG. 15 but with additional bits appended at the end. In the example shown by FIGS. 16-18, N equals 10 and the chunk size P is set to 1 byte. The address field is logically divided into groups of two TRAU channels. Each of the frames 610, 620 and 630 have an additional five bits appended at the end to distinguish address groups that are absent or present within the frame. FIG. 16 contains the entire channel address field 612 as indicated by all 1's in the address header field 614. At the next processing time, TRAU channel 2 changes its state from idle to active and begins contributing payload. The only address group that is affected by this change is the first group. Those address groups whose content is similar with corresponding groups from frame 1 are marked with letter x 622 and can be avoided for transmission in frame 2 (620). Similar action is taken in frame 3 (630) where channel 3 discontinues its payload contribution. Once again, only one address group 632 is affected (group 2). The net result for this example is a saving of 8 bits of layer 3 address information in both frames 2 and 3 (620, 630) or 7 bits if one additional bit for address header is taken into account. However, the addition of address header reduces this saving to 3 bits.

In general, the results are more favorable when N is larger than 10 (such as 30 in the case when an entire group is to be carried in a single AAL2 packet) because the address header overhead is less compared to the payload. Moreover, the use of ATM at transport layer allows the five bits of AAL2 UUI field to be used for the address header provided there are only five layer 3 address groups.

Those skilled in the art should readily appreciate that the programs and methods for aggregating and reducing network message traffic as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for aggregating and reducing network message traffic has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for aggregating network message traffic comprising
    identifying regenerable information in the message traffic at a sending side, the regenerable information indicative of data content in the message traffic reproducible at a receiving side from information accessible at the receiving side;
    detecting a plurality of frames by identifying frame boundaries defining a series of wireless messages in the message traffic;
    computing a traffic type for the wireless data in the frame by comparing, in a classifier, a payload portion of the message traffic packet to a predetermined set of expected message traffic types, the payload portion including user generated data;
    prior to processing a substantial portion of the frame, selectively invoking a compression operation based on the computed traffic type;
    eliminating, by selective extraction and reduction via the compression operation, the identified regenerable information to reduce the volume and associated bandwidth requirements of remaining message traffic to provide reduced message traffic; and
    framing the reduced message traffic according to predetermined formatting logic, the formatting logic providing transmission of the remaining reduced message traffic and regeneration of the reproducible data content from the identified regenerable information at the receiving side.

2. The method of claim 1 wherein the message traffic includes message traffic packets and identifying further comprises:
examining, in a classifier, portions of the message traffic packet indicative of a message payload carried in the message traffic packet; and
classifying, by classification logic in the classifier, the message traffic type, the message traffic type indicative of the regenerable information in the message traffic packet, further comprising classifying the traffic type of the frame, and invoking the type of compression operation applicable, prior to processing a substantial portion of the frame.

3. A method of transporting wireless network traffic comprising:
receiving a plurality of wireless messages, the wireless messages including a plurality of types of wireless data
detecting a plurality of frames by identifying frame boundaries defining the wireless messages;
computing a traffic type for the wireless data in the frame by comparing the beginning of a payload portion including user generated data of a message traffic packet in the frame to a predetermined set of expected message traffic types, further comprising computing the traffic type of the frame, and invoking the type of compression operation applicable, prior to processing a substantial portion of the frame; and
selectively invoking a compression operation based on the computed traffic type.

4. The method of claim 3 further comprising:
determining that the remaining data in the current frame is predictable, and if so,
sending a minimal code indicative of recreatable data in the remainder of the frame; and
marking a channel as having transmitted the entire frame.

5. The method of claim 4 wherein invoking a compression operation further comprises:
generating an output stream from each of a plurality of compression operations; and
aggregating a composite packet from a plurality of the output streams.

6. The method of claim 5 further comprising:
identifying a fixed size frame operable to transport the compressed data in the composite packet; and
transmitting the compressed data as payload in the fixed size frames according to a predetermined protocol.

7. The method of claim 6 further comprising appending a consistency header to each composite packet, the consistency header indicative of a sequence of composite packets and an indication of available channels.

8. The method of claim 7 wherein at least one of the aggregated output streams emanates from a compression operation processing voice traffic.

9. The method of claim 5 further comprising identifying a plurality of output streams from each of the compression operations, the compression operations responsive to a plurality of traffic type specific state machines.

10. The method of claim 9 further comprising FEC encoding the composite packets in a dynamic manner, comprising:
computing a current error rate;
comparing the computed error rate to a predetermined target error rate; and
adjusting the FEC rate in the computed error rate exceeds the target error rate.

11. The method of claim 10 further comprising:
identifying the error impact on multiple channels as a result of the compression; and
increasing the FEC correction rate to correspond to the identified error impact on the compressed channels.

12. The method of claim 11 further comprising interspersing uncompressed frames according to a predetermined format with the compressed frames.

13. The method of claim 3 wherein detecting the plurality of frames includes executing frame detection logic further comprising:
receiving incoming uncompressed signals on an incoming trunk line;
identifying a plurality of multiplexed channels from the incoming uncompressed signals, each of the channels operable to carry a plurality of frames of a particular traffic type; and
separating the incoming signals according to the identified channels by identifying timeslots corresponding to the channels.

14. The method of claim 13 further comprising detecting the plurality of frames by executing a state machine against available channels and subchannels on a trunk line, the state machine responsive to the sequence of bits received.

15. The method of claim 14 wherein the channels further comprise potentially available channels including subdivisions of available bandwidth.

16. The method of claim 15 wherein the state machine is operable to identify channel use by recognizing the type of traffic on the channel.

17. The method of claim 16 wherein the state machine is operable to commence compression upon receiving the first bit deterministic of the traffic type and corresponding compression to be performed.

18. The method of claim 17 further comprising executing a state machine for each channel, the channels further comprising active and inactive, wherein inactive channels do not receive modulated data and are operable to transition to an active state upon observing a framing signal, the state machine adapted to synchronize upon receipt of the frame corresponding to the framing signal.

19. The method of claim 5 further comprising:
periodically sampling each of a plurality of traffic channels;
maintaining a state machine for each channel operable to maintain a state indicative of the type of traffic carried on the channel;
identifying a particular type of traffic base on the state of the state machine; and
invoking a particular compression operation depending on the identified traffic type.

20. The method of claim 19 further comprising commencing compression early in frame processing after processing a small portion of an entire frame.

21. The method of claim 20 wherein compressing further comprises:
for each frame, identifying recreatable bits within the frame;
withholding the recreatable bits from the compressed transmitted frame; and
recreating the withheld bits upon receiving the transmitted frame.

22. The method of claim 21 wherein periodically sampling further comprises sampling at a predetermined interval based on the size of frames received on the channel and the likelihood of deterministically identifying traffic at the predetermined interval.

23. The method of claim 5 further comprising reconfiguring a channel to a different compressor when the detected state is indicative of a different traffic type.

24. The method of claim 23 wherein reconfiguring further comprises:
   detecting a change in the type of traffic received on a particular channel;
   identifying a new traffic type based on a subset of information in a frame; and
   selecting a different compressor corresponding to the new traffic type.

25. The method of claim 24 wherein detecting the change occurs in the first frame of the new traffic type.

26. The method of claim 25 detecting the change further comprises:
   receiving a frame of information; and
   identifying the traffic type based on a minimal subset of the bits in the frame.

27. The method of claim 26 wherein receiving a frame further comprises:
   identifying a synchronization pattern of a frame in a traffic channel; and
   extracting, from the identified synchronization pattern, a time alignment field.

28. A backhaul aggregation processor for transporting message traffic comprising:
   means for receiving a plurality of wireless messages, the wireless messages including a plurality of types of wireless data;
   means for detecting a plurality of frames by identifying frame boundaries defining the wireless messages;
   means for computing a traffic type for the wireless data in the frame the traffic type computed based on a payload portion of a frame, the payload portion including user generated data;
   means for selectively invoking a compression operation based on the computed traffic type;
   means for generating an output stream from each of a plurality of compression operations;
   means for aggregating a composite packet from a plurality of the output streams
   means for determining that the remaining data in the current frame is predictable, and if so,
   means for sending a minimal code indicative of recreatable data in the remainder of the frame;
   means for periodically sampling each of a plurality of traffic channels;
   means for maintaining a state machine for each channel operable to maintain a state indicative of the type of traffic carried on the channel; and
   means for marking a channel as having transmitted the entire frame.

29. A method for aggregating network message traffic comprising
   identifying regenerable information in the message traffic at a sending side, the regenerable information indicative of data content in the message traffic reproducible at a receiving side from information accessible at the receiving side, the message traffic including message traffic packets such that identifying further comprises:
      examining, in a classifier, a payload portion of the message traffic packet indicative of a message payload carried in the message traffic packet, the payload portion including user generated data;
      comparing, in the classifier, the payload portion of the message traffic packet to a predetermined set of expected message traffic types; and
      classifying, by classification logic in the classifier, the message traffic type, the message traffic type indicative of the regenerable information in the message traffic packet, further comprising classifying the traffic type of the frame, and invoking the type of compression operation applicable, prior to processing a substantial portion of the frame;
   detecting a plurality of frames by identifying frame boundaries defining a series of wireless messages in the message traffic;
   computing, from the classifying, a traffic type for the wireless data in the frame;
   selectively invoking a compression operation based on the computed traffic type
   eliminating, by selective extraction and reduction via the compression operation, the identified regenerable information to reduce the volume and associated bandwidth requirements of remaining message traffic to provide reduced message traffic; and
   framing the reduced message traffic according to predetermined formatting logic, the formatting logic providing transmission of the remaining reduced message traffic and regeneration of the reproducible data content from the identified regenerable information at the receiving side.

30. A method of transporting wireless network traffic comprising:
   receiving a plurality of wireless messages, the wireless messages including a plurality of types of wireless data;
   detecting a plurality of frames by identifying frame boundaries defining the wireless messages;
   computing a traffic type for the wireless data in the frame; and
   selectively invoking a compression operation based on the computed traffic type, the steps of
      computing the traffic type of the frame; and
      invoking the type of compression operation applicable, occurring prior to processing a substantial payload portion of the frame, the payload portion including user generated data; and
   determining that the remaining data in the current frame is predictable, and if so:
      sending a minimal code indicative of recreatable data in the remainder of the frame; and
      marking a channel as having transmitted the entire frame.

31. The method of claim 1 further comprising, based on the payload portion:
   computing the message traffic type; and
   identifying aggregation and reduction rules corresponding to the regenerable information.

32. The method of claim 31 wherein branch decisions are computed based on the message traffic type, and subsequent processing based on the branch decision commenced, prior to complete receipt of the incoming message traffic packet.

33. The method of claim 31 wherein the payload portion includes the earliest received bits for the payload of the message traffic packet.

* * * * *